(12) United States Patent
Weaver et al.

(10) Patent No.: US 8,829,106 B2
(45) Date of Patent: Sep. 9, 2014

(54) THERMOPLASTIC ELASTOMER FOR COLD AND WET APPLICATIONS

(75) Inventors: Laura B. Weaver, Lake Jackson, TX (US); Ashish Batra, Indianapolis, IN (US); Kim L. Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 190 days.

(21) Appl. No.: 13/510,611

(22) PCT Filed: Nov. 9, 2010

(86) PCT No.: PCT/US2010/056044
§ 371 (c)(1),
(2), (4) Date: May 2, 2013

(87) PCT Pub. No.: WO2011/062809
PCT Pub. Date: May 26, 2011

(65) Prior Publication Data
US 2013/0303680 A1    Nov. 14, 2013

Related U.S. Application Data

(60) Provisional application No. 61/263,262, filed on Nov. 20, 2009.

(51) Int. Cl.
| | |
|---|---|
| *C08L 23/16* | (2006.01) |
| *C08L 23/06* | (2006.01) |
| *C08L 21/00* | (2006.01) |
| *C08K 3/26* | (2006.01) |
| *C08L 23/12* | (2006.01) |
| *C08K 3/00* | (2006.01) |
| *C08K 5/00* | (2006.01) |
| *C08L 23/14* | (2006.01) |

(52) U.S. Cl.
CPC ............. *C08L 23/16* (2013.01); *C08L 23/06* (2013.01); *C08L 23/12* (2013.01); *C08K 3/0033* (2013.01); *C08K 5/0016* (2013.01); *C08L 2207/04* (2013.01); *C08L 23/14* (2013.01)
USPC ........... 524/525; 524/528; 524/426; 525/240; 525/232

(58) Field of Classification Search
CPC ..... C08L 23/26; C08L 23/0815; C08L 23/06; C08L 2205/05; C08L 21/00; C08K 3/26
USPC ................ 524/525, 528, 426; 525/240, 232
See application file for complete search history.

(56) References Cited

U.S. PATENT DOCUMENTS 6,506,842 B1 * 1/2003 Heck et al. .................. 525/194

FOREIGN PATENT DOCUMENTS

| WO | WO 9832795 | 7/1998 |
|---|---|---|
| WO | WO 03082971 | 10/2003 |
| WO | WO 03082971 A2 * | 10/2003 |

OTHER PUBLICATIONS

International Preliminary Report on Patentability dated Jun. 27, 2012; from counterpart EP application No. 10782479.9.
International Preliminary Report on Patentability dated May 31, 2012; from corresponding PCT Application No. PCT/US2010/056044.
Instructions to EP Examination Report dated Dec. 18, 2012; from EP counterpart Application No. 10782479.9.
EP Response to Examination Report dated Jan. 7, 2012; from EP counterpart Application No. 10782479.9.
Chinese Office Action dated Sep. 18, 2013; from Chinese counterpart Application No. 201080061962.8.
Instructions to Chinese Office Action dated Jan. 10, 2014; from Chinese counterpart Application No. 201080061962.8.
Response to Chinese Office Action dated Jan. 28, 2014; from Chinese counterpart Application No. 201080061962.8.
Chinese 2nd Office Action dated Mar. 27, 2014; from Chinese counterpart Application No. 201080061962.8.
Response to Chinese 2nd Office Action dated Jun. 11, 2014; from Chinese counterpart Application No. 201080061962.8.
Instructions to Chinese 2nd Office Action dated Jun. 3, 2014; from Chinese counterpart Application No. 201080061962.8.
Chinese Response to 2nd Office Action dated Jun. 11, 2014; from Chinese counterpart Application No. 201080061962.8.

* cited by examiner

*Primary Examiner* — Michael M Bernshteyn

(57) ABSTRACT

Thermoplastic compositions including component C, an ethylene/α-olefin interpolymer wherein the interpolymer has a Mooney Viscosity (ML 1+4, 125° C.) greater than, or equal to 55 and a ΔHf greater than, or equal to 36 J/g; and component D, a high density polyethylene (HDPE) are provided. In particular, the thermoplastic compositions are characterized by the ethylene/α-olefin interpolymer which is an ethylene/a-olefin/diene interpolymer having a rheology ratio (V0.1/V 100) at 190° C. greater than, or equal to 25. Also are provided the articles comprising the thermoplastic compositions.

8 Claims, No Drawings

THERMOPLASTIC ELASTOMER FOR COLD AND WET APPLICATIONS

REFERENCE TO RELATED APPLICATIONS

This application claims the benefit of U.S. Provisional Application No. 61/263,262, filed Nov. 20, 2009, the disclosure of which is incorporated herein by reference.

FIELD OF INVENTION

The invention relates to a thermoplastic elastomer composition rich in ethylene/α-olefin polymer content or propylene-α-olefin content, and more particularly to thermoplastic elastomer profiles for use in cold and/or wet applications.

BACKGROUND OF THE INVENTION

Gaskets are used in a variety of applications, for example in appliances, such as refrigerators and freezers, each requiring a flexible gasket for sealing the area between the door and appliance body. One of the most commonly used materials for the production of gaskets is polyvinyl chloride (PVC). PVC gaskets become brittle at low temperatures and cracking becomes a problem, and installation at lower temperatures is also difficult. Also, an unpleasant odor is present during compounding and extrusion of PVC, and when the finished gaskets are removed from packaging prior to installation. Moreover, PVC is not considered an environmentally friendly material because it involves the use of the following: vinyl chloride monomer production, phthalate plasticizers, heat stabilizers, and processing lubricants that may contain heavy metals. In addition, PVC-based gaskets, or other products, may give rise to disposal concerns as well as potential release of toxic materials in the event of incineration. Therefore, there is a need for a material to replace PVC-based profiles, particularly those used in large home appliances such as refrigerator and freezer gaskets, washing machines, dryers and dishwashers, and which satisfies the required specifications, and has improved processability and environmental friendliness. Other applications of such polymeric materials could include, for example, molded articles, overmolded articles, and tubing.

Profiles made of thermoplastics, manufactured by the profile extrusion process, are known. The design of compositions of thermoplastic elastomers (TPE) used for profiles demands that several properties be balanced. These include low viscosity at processing shear rates, ability to freeze quickly as the profile leaves the die so dimensional stability can be maintained, a certain compression set for elastic recovery under transportation and use conditions, ability to heat weld, and a certain softness for better sealing properties. Production of TPEs for profile applications has required rheological modification steps, such as peroxide modification of the thermoplastic elastomer or dynamic vulcanization, or use of expensive ingredients such as styrene block copolymer (SBC)-rich compounds, in order to balance the required end-use properties. Therefore, there remains a need for a TPE for profile use that meets all of the specifications to replace PVC-based profiles, while simplifying production and design of the TPEs.

SUMMARY OF THE INVENTION

One embodiment of the invention provides a first thermoplastic elastomer composition comprising at least one elastomeric polymer, component A, selected from the group of ethylene/α-olefin interpolymers and propylene/α-olefin interpolymers; at least one semi-crystalline polymer, component B, selected from the group of polypropylene homopolymers, propylene/ethylene copolymers and high density polyethylene; at least one oil; and at least one filler, wherein the thermoplastic elastomer composition is characterized by a Shape Retention Index (SRI) less than or equal to 1.6 at 10000 Pa s, and less than 4.5 at 1000 Pa s for compositions with TMA at 1000 μm greater than 85° C.

Another embodiment of the invention provides a second composition comprising: i) component C, an ethylene/α-olefin interpolymer wherein the interpolymer has a Mooney Viscosity (ML 1+4, 125° C.) greater than, or equal to, 55 and a ΔHf greater than, or equal to, 36 J/g; and ii) component D, a high density polyethylene (HDPE).

DETAILED DESCRIPTION OF THE INVENTION

The Inventive Thermoplastic Elastomer Compositions

The invention provides a first thermoplastic elastomer composition comprising at least one elastomeric polymer, component A, selected from the group consisting of ethylene/α-olefin interpolymers and propylene/α-olefin interpolymers; at least one semi-crystalline polymer, component B, selected from the group consisting of polypropylene homopolymers, propylene/ethylene copolymers and high density polyethylene; at least one oil; and at least one filler, wherein the thermoplastic elastomer composition is characterized by an SRI less than or equal to 1.6 at 10000 Pa-s, and less than 4.5 at 1000 Pa-s for compositions with TMA at 1000 μm greater than 85° C.

The invention also provides a second composition comprising at least one ethylene/α-olefin interpolymer, component C, which optionally comprises a third comonomer, wherein the interpolymer has a Mooney Viscosity greater than, or equal to, 55 and ΔHf greater than, or equal to, 36 J/g; and component D, a high density polyethylene (HDPE).

Certain embodiments of the inventive first and second compositions satisfy certain relationships between tan delta (tan δ) and viscosity (referred to as shape retention index or "SRI") over an extended temperature range.

Some embodiments of the inventive first and second compositions provide polymer compositions meeting specific tensile modulus, elongation, compression set at −10° C. and 40° C., UV resistance, weight reduction on heating, Vicat softening temperature, water resistance, split tear resistance, anti-microbial resistance, weight loss on cooling/heating cycle, odor, weld strength, chemical and oil resistance, tactile feel, and crystallization temperature, as may be specified by various OEMs of relevant end-use appliances.

Some embodiments of the inventive first and second compositions do not utilize formulated thermoplastic vulcanates or rheology-modified, reactive-extruded blends, or TPEs rich in styrenic polymers. That is, the inventive first and second compositions do not contain more than 50 wt % thermoplastic vulcanate and/or styrenic polymers based on the total thermoplastic elastomer composition weight.

Ethylene/α-Olefin Interpolymers Useful in Components A and C

Components A and C, in some embodiments, each independently comprises an ethylene/α-olefin copolymers, or blends thereof.

Components A and C, in some embodiments of the invention, each independently comprises an ethylene/α-olefin-diene interpolymers, or blends thereof.

Components A and C, in some embodiments of the invention, comprise blends of one or more ethylene/α-olefin copolymers and one or more ethylene/α-olefin-diene interpolymers.

Ethylene/α-olefin interpolymers, including both ethylene/α-olefin copolymers and ethylene/α-olefin-diene interpolymers, useful in various embodiments of the invention may have a ΔHf greater than, or equal to, 36 J/g. All values of ΔHf greater than, or equal to, 36 J/g are disclosed and included herein. For example, the ethylene/α-olefin interpolymers useful in the invention, alternatively, may have, for example, a ΔHf greater than, or equal to, 37 J/g; or, in the alternative, greater than, or equal to, 38 J/g.

Ethylene/α-olefin interpolymers useful in components A and C may have a Mooney Viscosity greater than, or equal to, 55. All values of Mooney Viscosity of greater than, or equal to, 55 are included and disclosed herein. For example, ethylene/α-olefin interpolymers useful in the invention may have a Mooney viscosity of greater than or equal to 55; in the alternative, greater than or equal to 57; in the alternative, greater than or equal to 59; or in the alternative, greater than or equal to 60; or in the alternative, greater than or equal to 61.

α-olefin monomers useful in the ethylene/α-olefin copolymers and interpolymers of components A and C may be selected, in certain embodiments, from the group of $C_3$-$C_{20}$ α-olefins. Preferred α-olefins for use in certain embodiments of the invention are designated by the formula $CH_2CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene Suitable dienes for use in the ethylene/α-olefin-diene interpolymers of components A and C, include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene.

In some embodiments, the ethylene/α-olefin-diene interpolymer has a molecular weight distribution (MWD) from 2 to 4. All values and sub-ranges from 2 to 4 are included and disclosed herein; for example, ethylene/α-olefin/diene interpolymer may have an upper limit of MWD of 2.2, 2.4, 2.6, 2.8, 3, 3.2, 3.4, 3.6, 3.8 or 4 and an MWD lower limit of 2, 2.2, 2.4, 2.6, 2.8, 3, 3.2, 3.4, 3.6, 3.8. The MWD of the ethylene/α-olefin/diene interpolymer may be from 2 to 4; in the alternative, from 2.5 to 3.5; in the alternative, from 2.8 to 3.8; or in the alternative, from 2.1 to 3.9.

In some embodiments, the ethylene/α-olefin-diene interpolymer has a % crystallinity (% Cry) from 13 to 20%, by weight. All values and sub-ranges from 13% Cry to 20% Cry are included and disclosed herein; for example the ethylene/α-olefin/diene interpolymer % Cry may have an upper limit of 14%, 15%, 16%, 17%, 18%, 19% or 20% by weight, and an ethylene/α-olefin-diene interpolymer % Cry lower limit of 13%, 14%, 15%, 16%, 17%, 18%, or 19% by weight. The % Cry of the ethylene/α-olefin/diene interpolymers useful in the invention may be from 13% to 20% by weight; in the alternative, from 14% to 19% by weight; in the alternative, from 15% to 18% by weight; or in the alternative, from 16% to 20% by weight.

In other embodiments, the ethylene/α-olefin-diene polymers have an ethylene content of from 50% to 70% by weight, a propylene content from 20% to 49% by weight, and a nonconjugated diene content from 1% to 10% by weight, all weight percentages based upon the total weight of the polymer. All values and sub-ranges from 50 to 70 wt % ethylene content in the ethylene/α-olefin/diene interpolymer are included and disclosed herein. For example, the ethylene/α-olefin/diene interpolymer may have a lower limit of 50, 55, 60, or 65 wt % ethylene and an upper limit of 55, 60, 65, or 70 wt % ethylene. All values and sub-ranges of 20 to 49 wt % propylene content in the ethylene/α-olefin/diene interpolymer are included and disclosed herein. For example, the ethylene/α-olefin/diene polymer may have a lower limit of 20, 25, 30, 35, 40 or 45 wt % propylene and an upper limit of 25, 30, 35, 40 or 49 wt % propylene. All values and sub-ranges of 1 to 10 wt % diene content in the ethylene/α-olefin/diene interpolymer are included and disclosed herein. For example, the ethylene/α-olefin/diene interpolymer may have a lower limit of 1, 3, 5, 7 or 9 wt % diene and an upper limit of 2, 4, 6, 8 or 10 wt % diene.

In some embodiments of the invention, the ethylene/α-olefin/diene interpolymer has a rheology ratio (V0.1/V100), at 190° C., greater than or equal to 25. All values of the ethylene/α-olefin/diene interpolymer rheology ratio of greater than or equal to 25 are included and disclosed herein; for example the ethylene/α-olefin/diene interpolymer rheology ratio, at 190° C., may alternatively be greater than or equal to 30; in the alternative, greater than or equal to 35; in the alternative, greater than or equal to 39; in the alternative, greater than or equal to 41; in the alternative, greater than or equal to 45; or in the alternative, greater than or equal to 50.

In one embodiment, the ethylene/α-olefin interpolymer is an EPDM.

In one embodiments of the inventive composition, components A and C comprise an ethylene/propylene/diene (EPDM) interpolymer, or blend thereof.

In some embodiments, the EPDM interpolymer contains from 20% to 80% by weight of ethylene, from 19% to 70% by weight of a higher α-olefin, and from 1% to 10% by weight of a nonconjugated diene. The more preferred higher α-olefins are propylene and 1-butene. The more preferred polyenes are ethylidene norbornene, 1,4-hexadiene, and dicyclopentadiene.

Examples of representative EPDM interpolymers for use include Nordel IP 4770R/P, Nordel IP 4760, Nordel IP 4785 and Nordel IP 3760P Hydrocarbon Rubbers available from Dow Chemical. Keltan polymers available from DSM Elastomers Americas, Baton Rouge, La., VISTALON EP(D)M ethylene/propylene rubber of EPDM interpolymers available from ExxonMobil Chemical or ROYALENE EPDM available from Lion Copolymers, LLC. Particularly useful are EPDM with a Mooney Viscosity greater than equal to 50.

In a preferred embodiment, the ethylene/α-olefin/diene interpolymer is not oil extended.

In a preferred embodiment, the ethylene/α-olefin/diene interpolymer is in the form of free-flowing pellets. As used herein, free-flowing refers to the ability of the pellets (of typical polymer pellet sizes) to move or flow at ambient conditions, without adhering together to form larger masses.

In one embodiment, the ethylene/α-olefin/diene interpolymer is formed using a single site catalyst. In a further embodiment, the single site catalyst is selected from a metallocene catalyst, a constrained geometry catalyst, or a post metallocene catalyst. In a further embodiment, the single site catalyst is selected from a constrained geometry catalyst, or a post metalllocene catalyst.

In one embodiment, the ethylene/α-olefin/diene interpolymer is formed using a constrained geometry catalyst.

In one embodiment, the ethylene/α-olefin/diene interpolymer is formed using a post metalllocene catalyst.

In one embodiment, the ethylene/α-olefin/diene interpolymer has a molecular weight distribution (MWD) less than 3.5, preferably less than 3.2, and more preferably less than 3.1.

In one embodiment, the ethylene/α-olefin/diene interpolymer is diluted with a minor amount of oil and/or process additive, such that the oil and/or additive level is less than 33% of the weight of the polymer in the pre-compounded state.

In a preferred embodiment, the ethylene/α-olefin/diene interpolymer is not diluted with an oil or process additive in the pre-compounded state.

In one embodiment, the ethylene/α-olefin/diene interpolymer comprises at least two ethylene/α-olefin/diene interpolymers, and preferably two interpolymers. In one embodiment, at least one interpolymer has a crystallization temperature (Tc) less than 35° C., preferably less than 30° C., and more preferably less than 25° C., and the overall ethylene/α-olefin/diene interpolymer has a crystallization temperature (Tc) greater than 20° C., preferably greater than 25° C., and more preferably greater than 28° C. In one embodiment, at least one interpolymer has a Mooney Viscosity (ML 1+4, 125° C.) from 30 to 100, preferably 40 to 90, and the overall ethylene/α-olefin/diene interpolymer has a Mooney Viscosity (ML 1+4, 125° C.) from 50 to 100, preferably 50 to 90. In one embodiment, at least one interpolymer has a MWD from 1.5 to 3, and the overall ethylene/α-olefin/diene interpolymer has a MWD from 2 to 3.5. In one embodiment, each interpolymer is an EPDM, and preferably the diene is 5-ethylidene-2-norbornene (ENB). As discussed herein, the ethylene/α-olefin/diene interpolymer may comprise a combination of these embodiments.

In one embodiment, the ethylene/α-olefin/diene interpolymer is an in-reactor blend of at least two polymers, and preferably two polymers.

In one embodiment, the ethylene/α-olefin/diene interpolymer is a post-reactor blend of at least two polymers, and preferably two polymers.

In a preferred embodiment, the ethylene/α-olefin/diene interpolymer is an EPDM.

In a further embodiment, the diene is ENB.

The ethylene/α-olefin/diene interpolymer may comprise a combination of two or more embodiments as described herein.

An ethylene/α-olefin interpolymer may comprise a combination of two or more embodiments as described herein.

An ethylene/α-olefin copolymer may comprise a combination of two or more embodiments as described herein.

An ethylene/α-olefin-diene interpolymer may comprise a combination of two or more embodiments as described herein.

Ethylene/α-Olefin Multiblock Copolymers Useful in Component A

As used herein, the terms "olefin block copolymers" and "OBC" mean olefin multiblock, excluding olefin diblock, copolymers.

In some embodiments, component A comprises olefin block copolymers, e.g., ethylene multiblock copolymers, such as those described in the International Publication No. WO2005/090427 and U.S. Publication 2006-199930A1, the disclosures of which are incorporated herein by reference. Such olefin block copolymers may be an ethylene/α-olefin interpolymer: (a) having a $M_w/M_n$ from about 1.7 to about 3.5, at least one melting point, $T_m$, in degrees Celsius, and a density, d, in grams/cubic centimeter (g/cc), wherein the numerical values of $T_m$ and d corresponding to the relationship: $T_m > -2002.9 + 4538.5(d) - 2422.2(d)^2$; or (b) having a $M_w/M_n$ from about 1.7 to about 3.5, and being characterized by a heat of fusion, ΔHf in Joules per gram (J/g), and a delta quantity, ΔT, in degrees Celsius defined as the temperature difference between the tallest DSC peak and the tallest CRYSTAF peak, wherein the numerical values of ΔT and ΔHf having the following relationships: ΔT>−0.1299(ΔHf)+62.81 for ΔHf greater than zero and up to 130 J/g, and ΔT≥48° C. for ΔHf greater than 130 J/g, wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d (g/cc), wherein the numerical values of Re and d satisfying the following relationship when ethylene/α-olefin interpolymer being substantially free of a cross-linked phase: Re>1481−1629(d); or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

The ethylene/α-olefin interpolymer may also: (a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3. Such olefin block copolymers are commercially available from The Dow Chemical Company, under the tradename INFUSE Olefin Block Copolymers.

An ethylene/α-olefin multiblock copolymer may comprise a combination of two or more embodiments as described herein.

Propylene/α-Olefin Interpolymers Useful in Component A

In some embodiments of the first thermoplastic elastomer composition, component A comprises one or more propylene/α-olefin interpolymers.

Although ethylene is not generally characterized as an α-olefin, as used herein the term propylene/α-olefin interpolymers in connection with component A, includes propylene-ethylene interpolymers, as further characterized below.

Such propylene/α-olefin copolymers are further described in details in the U.S. Pat. Nos. 6,960,635 and 6,525,157, incorporated herein by reference. Such propylene/α-olefin copolymers are commercially available from The Dow Chemical Company, under the tradename VERSIFY Elastomers and Plastomers, or from ExxonMobil Chemical Company, under the tradename VISTAMAXX.

In one embodiment, the propylene/α-olefin copolymer, is characterized as having substantially isotactic propylene sequences. "Substantially isotactic propylene sequences" means that the sequences have an isotactic triad (mm) measured by $^{13}$CNMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain, determined by $^{13}$CNMR spectra.

The propylene/α-olefin copolymer may have a melt flow rate in the range of from 0.1 to 25 g/10 minutes, measured in accordance with ASTM D-1238 (at 230° C./2.16 Kg). All individual values and sub-ranges from 0.1 to 25 g/10 minutes are included herein and disclosed herein; for example, the melt flow rate can be from a lower limit of 0.1 g/10 minutes, 0.2 g/10 minutes, or 0.5 g/10 minutes to an upper limit of 25 g/10 minutes, 15 g/10 minutes, 10 g/10 minutes, 8 g/10 minutes, or 5 g/10 minutes. For example, the propylene/α-olefin copolymer may have a melt flow rate in the range of 0.1 to 10 g/10 minutes; or in the alternative, the propylene/α-olefin copolymer may have a melt flow rate in the range of 0.2 to 10 g/10 minutes.

The propylene/α-olefin copolymer has a crystallinity in the range from 1 percent by weight (a heat of fusion of 2 Joules/gram (J/g)) to 30 percent by weight (a heat of fusion of 50 Joules/gram). All individual values and sub-ranges from 1 percent by weight (a heat of fusion of 2 Joules/gram) to 30 percent by weight (a heat of fusion of 50 Joules/gram) are included herein and disclosed herein; for example, the crystallinity can be from a lower limit of 1 percent by weight (a heat of fusion of 2 Joules/gram), 2.5 percent (a heat of fusion of 4 Joules/gram), or 3 percent (a heat of fusion of 5 Joules/gram) to an upper limit of 30 percent by weight (a heat of fusion of 50 Joules/gram), 24 percent by weight (a heat of fusion of 40 Joules/gram), 15 percent by weight (a heat of fusion of 24.8 Joules/gram) or 7 percent by weight (a heat of fusion of 11 Joules/gram). For example, the propylene/α-olefin copolymer may have a crystallinity in the range of from 1 percent by weight (a heat of fusion of 2 Joules/gram) to 24 percent by weight (a heat of fusion of 40 Joules/gram); or in the alternative, the propylene/α-olefin copolymer may have a crystallinity in the range of from 1 percent by weight (a heat of fusion of 2 Joules/gram) to 15 percent by weight (a heat of fusion of 24.8 Joules/gram); or in the alternative, the propylene/α-olefin copolymer may have a crystallinity in the range of from 1 percent by weight (a heat of fusion of 2 Joules/gram) to 7 percent by weight (a heat of fusion of 11 Joules/gram); or in the alternative, the propylene-α-olefin copolymer may have a crystallinity in the range of from 1 percent by weight (a heat of fusion of 2 Joules/gram) to 5 percent by weight (a heat of fusion of 8.3 Joules/gram). The crystallinity is measured via DSC method, as described herein. The propylene/α-olefin copolymer comprises units derived from propylene and units derived from one or more α-olefin comonomers. Exemplary comonomers utilized in the propylene/α-olefin copolymer are $C_4$ to $C_{10}$ α-olefins; for example, $C_4$, $C_6$ and $C_8$ α-olefins. A particularly preferred polyethylene/α-olefin of component A is propylene-ethylene copolymer.

The propylene/α-olefin copolymer comprises from 1 to 40 percent by weight of one or more α-olefin comonomers, including as discussed above, ethylene. All individual values and sub-ranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/α-olefin copolymer comprises from 1 to 35 percent by weight of one or more α-olefin comonomers; or in the alternative, the propylene/α-olefin copolymer comprises from 1 to 30 percent by weight of one or more α-olefin comonomers; or in the alternative, the propylene/α-olefin copolymer comprises from 3 to 27 percent by weight of one or more α-olefin comonomers; or in the alternative, the propylene/α-olefin copolymer comprises from 3 to 20 percent by weight of one or more α-olefin comonomers; or in the alternative, the propylene/α-olefin copolymer comprises from 3 to 15 percent by weight of one or more α-olefin comonomers.

In some embodiments of the invention, the propylene/α-olefin copolymer is propylene/ethylene wherein the ethylene is present in amounts from 9 to 15 wt % of the total propylene/ethylene copolymer weight. All individual values and sub-ranges from 9 to 16 weight percent are included herein and disclosed herein; for example, the comonomer content can be from a lower limit of 9, 10, 11, 12, 13 or 14 weight percent to an upper limit of 10, 11, 12, 13, 14, or 15 weight percent. For example, the propylene/ethylene copolymer may comprise in a weight percent derived from ethylene of from 9 to 15 wt %, or in the alternative, from 10 to 14 wt %, or in the alternative, from 11 to 13 wt %.

The propylene/α-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/α-olefin copolymers are further described in details in the U.S. Pat. Nos. 6,960,635 and 6,525,157, incorporated herein by reference. Such propylene/α-olefin copolymers are commercially available from The Dow Chemical Company, under the tradename VERSIFY Elastomers and Plastomers, or from ExxonMobil Chemical Company, under the tradename VISTAMAXX.

In one embodiment, the propylene-α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16, and even more preferably between 4 and 15, weight percent units derived from at least one of ethylene and/or a $C_4C_{10}$ α-olefin; and containing an average of at least 0.001, preferably an average of at least 0.005 and more preferably an average of at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene interpolymer is not critical to the definition of this embodiment of the instant invention, but typically it does not exceed 3 long chain branches/1000 total carbons. Such propylene-α-olefin copolymers are further described in details in the U.S. Provisional Patent Application No. 60/988,999; International Publication WO2009/067337A1, and EP0964890B1, each of which is incorporated herein by reference.

A propylene/α-olefin interpolymer may comprise a combination of two or more embodiments as described herein.

Polypropylene Homopolymers and Propylene/Ethylene Copolymers Useful in Component B Embodiments of the inventive first thermoplastic elastomer composition also include at least one semi-crystalline polymer, component B, selected from the group consisting of polypropylene homopolymers, propylene/ethylene copolymers and high density polyethylene. As further detailed below, the propylene/ethylene copolymers useful in component B have different structure and properties from those of the propylene/α-olefin interpolymers useful in components A and C.

In one embodiment, Component B is a polypropylene homopolymer.

In one embodiment, the polypropylene homopolymer has a melting point (Tm), as determined by DSC, greater than, or equal to, 125° C., or greater than, or equal to, 130° C., greater than, or equal to, 135° C., greater than, or equal to, 140° C.

In one embodiment, the polypropylene homopolymer has a heat of fusion (ΔHf), as determined by DSC, greater than, or equal to, 75 J/g, or greater than, or equal to, 80 J/g, greater than, or equal to, 85 J/g.

In one embodiment, the polypropylene homopolymer has a weight average molecular weight ($M_w$) within the range having an upper limit of 5,000,000 g/mol, or 500,000 g/mol, and a lower limit of 10,000 g/mol, or 50,000 g/mol.

In one embodiment, the polypropylene homopolymer has a molecular weight distribution $M_w/M_n$ (MWD), sometimes referred to as a "polydispersity index" (PDI), within the range having an upper limit of 40, or 30, or 20, or 10, and a lower limit of 2, or 3, or 4, or 5.

In one embodiment, Component B is a propylene/ethylene copolymer.

In one embodiment, the propylene/ethylene copolymer comprises greater than, or equal to, 90 wt %, or greater than, or equal to, 92 wt %, or greater than, or equal to, 94 wt %, or greater than, or equal to, 96 wt %, or greater than, or equal to, 98 wt % of polymerized propylene, based on the weight of the copolymer.

In one embodiment, the propylene/ethylene copolymer comprises less than, or equal to, 10 wt %, or less than, or equal to, 8 wt %, or less than, or equal to, 6 wt %, or less than, or equal to, 4 wt %, or less than, or equal to, 2 wt % of polymerized ethylene, based on the weight of the copolymer.

In one embodiment, the propylene/ethylene copolymer has a melting point (Tm), as determined by DSC, greater than, or equal to, 125° C., or greater than, or equal to, 130° C., greater than, or equal to, 135° C., greater than, or equal to, 140° C.

In one embodiment, the propylene/ethylene copolymer has a heat of fusion (ΔHf), as determined by DSC, greater than, or equal to, 75 J/g, or greater than, or equal to, 80 J/g, greater than, or equal to, 85 J/g.

In one embodiment, the propylene/ethylene copolymer has a weight average molecular weight ($M_w$) within the range having an upper limit of 5,000,000 g/mol, or 500,000 g/mol, and a lower limit of 10,000 g/mol, or 50,000 g/mol.

In one embodiment, the propylene/ethylene copolymer has a molecular weight distribution $M_w/M_n$ (MWD), sometimes referred to as a "polydispersity index" (PDI), within the range having an upper limit of 40, or 30, or 20, or 10, and a lower limit of 2, or 3, or 4, or 5.

The propylene homopolymer may be formed by the homopolymerization of propylene in a single stage or multiple stage reactors.

The propylene/ethylene copolymer may be formed by copolymerizing propylene and ethylene in a single stage or multiple stage reactors.

Polymerization methods for preparing the polypropylene homopolymer or propylene/ethylene copolymer include high pressure, slurry, gas, bulk, solution phase, and combinations thereof. Catalyst systems include traditional Ziegler-Natta catalysts and single-site metallocene catalyst systems. In one embodiment, the catalyst used has a high isospecificity. Each polymerization may be carried out by a continuous or batch process, and may include the use of chain transfer agents, scavengers, or other such additives well known to those skilled in the art. The polypropylene homopolymer or propylene/ethylene copolymer may also contain one or more additives, such as flow improvers, nucleators, and antioxidants.

A polypropylene homopolymer may comprise a combination of two or more embodiments as described herein.

A propylene/ethylene copolymer may comprise a combination of two or more embodiments as described herein.

HDPE Useful in Components B and D

Some embodiments of the inventive first thermoplastic elastomer composition also include at least one high density polyethylene.

Embodiments of the inventive second composition comprise at least one HDPE.

The properties of the high density polyethylene (HDPE) useful in certain embodiments of the invention vary depending upon the desired application. The molecular weight of the HDPE for use in certain embodiments of the invention varies depending upon the application, but may be indicated using a melt flow measurement $I_2$ is inversely proportional to the molecular weight of the polymer. The higher the molecular weight, the lower the $I_2$, although the relationship is not linear.

High-density polyethylene useful in components B and D of certain embodiments of the invention may have a density in the range from 0.94 to 0.96 g/cc. All individual values and sub-ranges from 0.94 to 0.96 g/cc are included herein and disclosed herein; for example, the high-density polyethylene composition may have a lower limit density of 0.94 g/cc, 0.945 g/cc, 0.95 or 0.955 g/cc and an upper limit density of 0.945 g/cc, 0.949 g/cc, 0.955 g/cc or 0.96 g/cc. For example, the high-density polyethylene may have a density in the range of 0.940 to 0.950 g/cc; or in the alternative, from 0.95 to 0.96 g/cc; or in the alternative, from 0.945 to 0.960 g/cc.

In one embodiment, the high-density polyethylene may have an $I_2$ from 1 to 50 g/10 min. All values and sub-ranges from 1 to 50 g/10 min are disclosed and included herein; for example, the high-density polyethylene composition may have an $I_2$ lower limit of 1, 10, 20, 30, 40 or 45 g/10 min and an upper limit of 5, 15, 25, 35, 45, or 50 g/10 min. The high-density polyethylene may have an $I_2$ from 1 to 50 g/10 min; or in the alternative, from 20 to 40 g/10 min; or in the alternative, from 30 to 43 g/10 min; in the alternative, from 5 g/10 min to 30 g/10 min; or in the alternative, from 5 to 46 g/10 min.

Molecular weight distribution (Mw/Mn) of the HDPE can be narrow or broad, e.g., Mw/Mn from 2 to as high as 40. All individual ranges from 2 to 40 are included and disclosed herein: for example, the HDPE may have a lower limit of Mw/Mn of 2, 5, 10, 13, 23 or 36 and an upper limit of Mw/Mn of 5, 12, 20, 27, 33, 39, or 40.

In those embodiments of the invention comprising an HDPE in component B or D, the HDPE may be present in an amount from 30 to 100 PHR, based on the weight of the ethylene/α-olefin interpolymer. All values and sub-ranges from 30 to 100 PHR are included and disclosed herein; for example the HDPE may be present at an upper limit of 40, 50, 60, 70, 80, 90 or 100 PHR and at a lower limit of 30, 40, 50, 60, 70, 80, or 90 PHR. The amount of HDPE may range, for example, from 30 to 70 PHR; in the alternative, from 30 to 60 PHR; in the alternative, from 30 to 40 PHR; in the alternative from 40-80 PHR; in the alternative, from 60 to 90 PHR; or in the alternative from 60 to 85 PHR.

The HDPE may be produced by any process including metallocene, Cr and Ziegler-Natta catalyst processes. Any conventional ethylene homopolymerization or copolymerization reactions may be employed to produce the high-density polyethylene useful in embodiments of the invention.

Such conventional ethylene homopolymerization or copolymerization reactions include, but are not limited to, gas phase polymerization, slurry phase polymerization, liquid phase polymerization, and combinations thereof using conventional reactors, e.g. gas phase reactors, loop reactors, stirred tank reactors, and batch reactors.

An HDPE may comprise a combination of two or more embodiments as described herein.

Alternative Embodiments of the Thermoplastic Elastomer Compositions

One embodiment of the first thermoplastic elastomer composition comprises at least one elastomeric polymer, component A, selected from the group of ethylene/α-olefin interpolymers and propylene/α-olefin interpolymers, at least one semi-crystalline polymer, component B, selected from the group of polypropylene homopolymers, propylene/ethylene copolymers and high density polyethylene, at least one oil, and at least one filler wherein the first thermoplastic elastomer composition is characterized by an SRI less than or equal to 1.5 at 10000 Pa-s, and less than 4.5 at 1000 Pa-s for compositions with TMA greater than 85° C.

In an alternative embodiment, the first thermoplastic elastomer composition provides a composition in accordance with any of the preceding embodiments, except that the composition is further characterized by a hardness in the range of 40-85 Shore A, tensile strength between 2 and 8 MPa, elongation>400%, and compression set at 40° C. from 30 to 75% as measured by ISO 815, Type B method.

In an alternative embodiment, the first thermoplastic elastomer composition provides a composition in accordance with any of the preceding embodiments, except that the composition the component A is one or more EPDM.

In an alternative embodiment, the first thermoplastic elastomer composition provides a composition in accordance with any of the preceding embodiments, except that the component A is one or more olefin block copolymer, in combination in an amount from 20 wt % to 50 wt % based on the total weight of the thermoplastic elastomer composition.

In an alternative embodiment, the first thermoplastic elastomer composition provides a composition in accordance with any of the preceding embodiments, except that component A, is an ethylene/α-olefin copolymer.

In an alternative embodiment, the first thermoplastic elastomer composition provides a composition in accordance with any of the preceding embodiments, except that component A is an ethylene/α-olefin interpolymer, and the semi-crystalline polymer, component B, is a high density polyethylene.

In some preferred embodiments of the first thermoplastic elastomer compositions, the elastomeric polymer, component A, is an ethylene/α-olefin interpolymer, and the semi-crystalline polymer, component B, is a high density polyethylene.

In an alternative embodiment, the first thermoplastic elastomer composition has an SRI less than, or equal to, 1.5 at 10000 Pa s.

In alternative embodiments of the first thermoplastic elastomer composition, the elastomeric polymer, component A, is ethylene/α-olefin interpolymer, and the semi-crystalline polymer, component B, is a polypropylene homopolymer.

In alternative embodiments of the first thermoplastic elastomer composition, the elastomeric polymer, component A, is ethylene/α-olefin interpolymer, and the semi-crystalline polymer, component B, is one or more semi-crystalline propylene/ethylene copolymers.

In alternative embodiments of the first thermoplastic elastomer composition, the addition of an oil and/or filler is optional.

In alternative embodiments of the first thermoplastic elastomer compositions, the elastomeric polymer, component A, is a propylene/α-olefin interpolymer, and the semi-crystalline polymer, component B, is a high density polyethylene.

In alternative embodiments of the first thermoplastic elastomer composition, the elastomeric polymer, component A, is a propylene/α-olefin interpolymer, and the semi-crystalline polymer, component B, is a polypropylene homopolymer.

In alternative embodiments of the first thermoplastic elastomer composition, the elastomeric polymer, component A, is a propylene/α-olefin interpolymer, and the semi-crystalline polymer, component B, is one or more propylene/ethylene copolymers.

In some embodiments of the invention, the first thermoplastic elastomer compositions are inventive compositions comprising an elastomer comprising an ethylene/α-olefin interpolymer (optionally further comprising a diene) or propylene/α-olefin interpolymer, with rheology ratios measured at 190° C. (viscosity at 0.1 rad/s to viscosity at 100 rad/s (V0.1/V100)) greater than 25. In certain aspects, the inventive compositions provided herein comprise at least one thermoplastic vulcanizates (TPVs) and/or hydrogenated styrenic block copolymers ("HSBC," such as SEBS, SEPS or SEEPS), for providing an improvement in compression set at elevated temperatures in certain compositions, a propylene-based polymer (such as, homopolypropylene (hPP) or random copolymer of propylene (RCP)), or a low density polyethylene (LDPE) or high density polyethylene (HDPE).

One embodiment of the inventive first and second compositions is further characterized by a hardness in the range of 40-85 Shore A, tensile strength from 2 to 8 MPa, elongation>400%, and compression set at 40° C. from 30 to 75%. In some embodiments of the inventive first thermoplastic elastomer composition, the component A is one or more EPDM, in combination, in the amount from 20 wt % to 50 wt % based on the total weight of the thermoplastic elastomer composition.

In some embodiments of the inventive first and second compositions, the ethylene/α-olefin/diene interpolymer has a rheology ratio (V0.1/V100), at 190° C., greater than, or equal to 25.

In some embodiments of the inventive first and second compositions, the ethylene/α-olefin interpolymer is an ethylene/propylene interpolymer.

In some embodiments of the inventive first and second compositions, the ethylene/propylene interpolymer has a rheology ratio (V0.1N100), at 190° C., greater than, or equal to 22.

In some embodiments of the inventive first and second compositions, the HDPE has an $I_2$ from 1 to 50 g/10 min, preferably from 5 g/10 min to 30 g/10 min.

In a preferred embodiment, the inventive first and second compositions do not comprise a vulcanization agent. Vulcanization agents include peroxides, azo compounds, phenols, azides, aldehyde-amine reaction products, substituted ureas, substituted guanidines; substituted xanthates; substituted dithiocarbamates; sulfur-containing compounds, such as thiazoles, imidazoles, sulfonamides, thiuramidisulfides, paraquinonedioxime, dibenzoparaquinonedioxime, sulfur; silanes. See Encyclopedia of Chemical Technology, Vol. 17, 2nd edition, Interscience Publishers, 1968; also Organic Peroxides, Daniel Seem, Vol. 1, Wiley-Interscience, 1970); and C. P. Park, "Polyolefin Foam" Chapter 9, Handbook of Polymer Foams and Technology, D. Klempner and K. C. Frisch, eds., Hanser Publishers, New York (1991), pages 198-204. See also U.S. Pat. Nos. 7,741,408; 6,506,842; 5,869,591 and 5,977,271. Each reference is incorporated herein by reference.

In a preferred embodiment, an inventive first or second composition does not comprise a free radical coagent. The free radical coagent is a monomer or low molecular weight polymer having two or more functional groups with high response to free radicals. Typically, these functional groups are either methacrylate, allyl or vinyl. Free radical coagents include diallyl terephthalate, triallylcyanurate, triallylisocyanurate, 1,2 polybutadiene, divinyl benzene, trimethylolpropane trimethacrylate, polyethylene glycol dimethacrylate, ethylene glycol dimethacrylate, pentaerythritol triacrylate, allyl methacrylate, N N'-m-phenylene bismaleimide, toluene bismaleimide-p-quinone dioxime, nitrobenzene, diphenylguanidine.

In one embodiment of the inventive first or second composition, each comprises ethylene/α-olefin interpolymer and HDPE. In one embodiment the ethylene/α-olefin interpolymer is present in an amount greater than the amount of the HDPE.

In one embodiment of the inventive first or second composition, the weight ratio of the ethylene/α-olefin interpolymer to the HDPE is from 2 to 5, preferably from 2.2 to 4, and more preferably from 2.5 to 3.5.

In one embodiment, the inventive first or second composition comprises ethylene/α-olefin/diene interpolymer and HDPE. In one embodiment of the first or second compositions, the ethylene/α-olefin/diene interpolymer is EPDM. In a further embodiment the diene is ENB.

In one embodiment of the inventive first or second composition, the ethylene/α-olefin/diene interpolymer is present in an amount greater than the amount of the HDPE. In one embodiment the ethylene/α-olefin/diene interpolymer is EPDM. In a further embodiment the diene is ENB.

In one embodiment of the inventive first or second composition, the weight ratio of the ethylene/α-olefin/diene interpolymer to the HDPE is from 2 to 5, preferably from 2.2 to 4, more preferably from 2.5 to 3.5. In a further embodiment, the ethylene/α-olefin/diene interpolymer is an EPDM. In a further embodiment, the diene is ENB.

In one embodiment, the inventive first or second composition comprises ethylene/α-olefin copolymer and HDPE. In a further embodiment, the α-olefin is a C3-C10 α-olefin, and preferably selected from 1-octene, 1-hexene, 1-butene or propylene.

In one embodiment the ethylene/α-olefin copolymer is present in an amount greater than the amount of the HDPE. In a further embodiment, the α-olefin is a C3-C10 α-olefin, and preferably selected from 1-octene, 1-hexene, 1-butene or propylene.

In one embodiment, the weight ratio of the ethylene/α-olefin copolymer to the HDPE is from 2 to 5, preferably from 2.2 to 4, more preferably from 2.5 to 3.5. In a further embodiment, the α-olefin is a C3-C10 α-olefin, and preferably selected from 1-octene, 1-hexene, 1-butene or propylene.

In some embodiments of the inventive first thermoplastic elastomer composition, the component A is one or more olefin block copolymer, in combination, in the amount from 20 wt % to 50 wt % based on the total weight of the thermoplastic elastomer composition.

In some embodiments of the inventive second composition, the component C is one or more olefin block copolymer, in combination, in the amount from 20 wt % to 50 wt % based on the total weight of the thermoplastic elastomer composition.

In some embodiments of the inventive first thermoplastic elastomer composition, the elastomeric polymer, component A, comprises a diene.

In some embodiments of the inventive second composition, the elastomeric polymer, component C, comprises a diene.

In some embodiments of the inventive first thermoplastic elastomer composition, the elastomeric polymer, component A, is an ethylene/α-olefin interpolymer, and the semi-crystalline polymer, component B, is a high density polyethylene (HDPE).

In some embodiments of the inventive first or second compositions, the ethylene/α-olefin interpolymer has a ΔHf greater than, or equal to, 36 J/g, preferably greater than, or equal to, 38 J/g.

In some embodiments of the first or second inventive composition, the ethylene/α-olefin interpolymer is an ethylene/α-olefin/diene interpolymer.

In some embodiments of the inventive first thermoplastic elastomer composition, the component A is one or more EPDM, in combination in an amount from 20 wt % to 50 wt % based on the total weight of the thermoplastic elastomer composition.

In some embodiments of the inventive first and second compositions, the HDPE present in an amount from 30 to 100 PHR, based on the weight of the ethylene/α-olefin interpolymer.

The invention further provides a second composition comprising: i) component C, an ethylene/α-olefin interpolymer, optionally comprising a third comonomer, wherein the interpolymer has a Mooney Viscosity (ML 1+4, 125° C.) greater than, or equal to, 55 and ΔHf greater than, or equal to, 36 J/g; and ii) component D, a high density polyethylene (HDPE).

In an alternative embodiment, the second composition provides a composition in accordance with any of the preceding embodiments, except that wherein the second composition is further characterized by an SRI less than or equal to 1.5 at 10000 Pa-s, and less than 4.5 at 1000 Pa-s for compositions with TMA greater than 85° C.

In an alternative embodiment, the second composition provides a composition in accordance with any of the preceding embodiments, except tha component C has a MWD less than 4.

In an alternative embodiment, the second composition provides a composition in accordance with any of the preceding embodiments, except tha the ethylene/α-olefin interpolymer is an ethylene/α-olefin/diene interpolymer.

In an alternative embodiment, the second composition provides a composition in accordance with any of the preceding embodiments, except that the ethylene/α-olefin/diene interpolymer has a rheology ratio (V0.1/V100), at 190° C., greater than, or equal to 25.

In an alternative embodiment, the second composition provides a composition in accordance with any of the preceding embodiments, except that the ethylene/α-olefin interpolymer is an ethylene/propylene interpolymer.

In an alternative embodiment, the second composition provides a composition in accordance with any of the preceding embodiments, except that the ethylene/propylene interpolymer has a rheology ratio (V0.1/V100), at 190° C., greater than, or equal to 22.

In an alternative embodiment, the second composition provides a composition in accordance with any of the preceding embodiments, except that the HDPE has an $I_2$ from 1 to 50 g/10 min, or from 5 to 40 g/10 min, or from 10 to 20 g/10 min.

In an alternative embodiment, the second composition provides a composition in accordance with any of the preceding embodiments, except that the HDPE is present in an amount from 30 to 100 PHR, based on the weight of the ethylene/α-olefin interpolymer.

In an alternative embodiment, the second composition provides a composition in accordance with any of the preceding embodiments, except that the second composition further comprises an oil.

In an alternative embodiment, the second composition provides a composition in accordance with any of the preceding embodiments, except that the second composition further comprises a filler.

The invention further provides an article comprising at least one component formed from the composition of any one of the preceding embodiments.

In one embodiment, the inventive article has a tack force less than, or equal to, 0.012 N.

In an alternative embodiment, the inventive article is in accordance with any of the preceding embodiments, except that the article has a compression set, at 70° C., less than 70 percent, as measured by ASTM D-395.

Some embodiments of the inventive second composition further comprise an oil.

Some embodiments of the inventive second composition further comprise a filler.

Some embodiments of the inventive article have a tack force less than, or equal to, 0.012 N.

Some embodiments of the inventive article have a compression set, at 70° C., less than 70 percent.

Embodiments of the invention provide polyolefin-based inventive compositions, further including additives and fillers to produce a rheological behavior to replace PVC-based profiles while meeting the performance properties demanded by the intended end-use application.

One embodiment of the inventive second composition is further characterized by a hardness in the range of 40-85 Shore A, tensile strength from 2 to 8 MPa, elongation>400%, and compression set at 40° C. from 30 to 75%.

One embodiment of the second composition comprises at least one ethylene/α-olefin interpolymer, component C, wherein the interpolymer has a Mooney Viscosity greater than, or equal to, 55 and ΔHf greater than, or equal to, 36 J/g; and component D, at least one high density polyethylene (HDPE).

One embodiment of the second composition is characterized by an SRI less than or equal to 1.6 at 10000 Pa-s, and less than 4.5 at 1000 Pa-s for compositions with TMA at 1000 μm greater than 85° C.

One embodiment of the second composition comprises a component c having a MWD less than 3.

One embodiment of the second composition comprises a component c having a MWD less than 2.5.

One embodiment of the second composition comprises a component c having a MWD less than 2.

One embodiment of the second composition comprises a component c having a MWD in the range from 1 to 3.

One embodiment of the second composition comprises a component c having a MWD in the range from 1.5 to 3.

Additives

In some embodiments, the inventive compositions further comprise an oil. Oils useful in embodiments of the invention include, for example, a paraffinic oil, aromatic oil, napthenic oil, hydrogenated (white) oil (such as, Kaydol oil), vegetable and animal oil and their derivatives, petroleum derived oils or a combination thereof. When present, the oil present may be in an amount from 50 to 200 PHR (based on the weight of the ethylene/α-olefin interpolymer). All values and sub-ranges from 50 to 200 PHR are included and disclosed herein; for example, the oil amount may have a lower limit of 50, 70, 90, 110, 130, 150, 170, or 190 PHR and an upper limit of 60, 80, 100, 120, 140, 160, 180 or 200 PHR. The oil may be present in an amount from 50 to 200 PHR; in the alternative, from 50 to 130 PHR; in the alternative, from 70 to 180 PHR; in the alternative, from 80 to 120 PHR; or in the alternative, from 130 to 190 PHR.

A variety of additives, optionally, may be used in compositions of the invention. The additives include surface tension modifiers, flame retardants, scratch and mar modifying additives, anti-block agents, slip additives (including a wide variety of primary amides, secondary amides and secondary bisamides, such as oleamides, erucamides and stearamides), lubricants, antimicrobial agents (such as organometallics, isothazolones, organosulfurs and mercaptans); antioxidants (such as phenolics, secondary amines, phosphites and thioesters); antistatic agents (such as quaternary ammonium compounds, amines, and ethoxylated, propoxylated or glycerol compounds); hydrolytic stabilizers; lubricants (such as fatty acids, fatty alcohols, esters, fatty amides, metallic stearates, paraffinic and microcrystalline waxes, silicones and orthophosphoric acid esters); mold release agents (such as fine-particle or powdered solids, soaps, waxes, silicones, polyglycols and complex esters such as trimethylolpropane tristearate or pentaerythritol tetrastearate); pigments, dyes and colorants; plasticizers (such as esters of dibasic acids (or their anhydrides) with monohydric alcohols such as o-phthalates, adipates and benzoates); heat stabilizers (such as organotin mercaptides, an octyl ester of thioglycolic acid and a barium or cadmium carboxylate); ultraviolet light stabilizers (such as a hindered amine, an o-hydroxy-phenylbenzotriazole, a 2-hydroxy, 4-alkoxyenzophenone, a salicylate, a cyanoacrylate, a nickel chelate and a benzylidene malonate and oxalanilide); and zeolites, molecular sieves and other known deodorizers. One example of a hindered phenolic antioxidant is Irganox™ 1076 antioxidant, available from BASF. Each of the above additives, if used, typically does not exceed 5 wt %, based on total composition weight, and may be from 0.001 to 2 wt %; preferably from 0.01 to 1 wt % and more preferably from 0.1 to 5 wt %.

In some embodiments of the invention, a composition further comprises polydimethysiloxane. When present, polydimethylsiloxane may be present in an amount from 0 to 0.5 wt %, based on the total weight of the thermoplastic elastomer composition.

The inventive compositions disclosed herein may comprise at least one filler which can be used to adjust, for example, volume, weight, costs, and/or technical performance. Non-limiting examples of fillers useful in various embodiments of the invention include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. The fillers disclosed in U.S. Pat. No. 6,103,803 and Zweifel Hans et al., "Plastics Additives Handbook," Hanser Gardner Publications, Cincinnati, Ohio, 5th edition, Chapter 17, pages 901-948 (2001), both of which are incorporated herein by reference, may also be used in various embodiments of the invention.

The amount of the filler in the inventive composition may be from 20 to 200 PHR (based on weight of ethylene/α-olefin interpolymer). All values and sub-ranges from 20 to 200 PHR are disclosed and included herein; for example, the filler may be present from an upper limit of 30, 60, 90, 120, 150, 170 or 200 PHR and from a lower limit of 20, 50, 80, 110, 140, 170 or 190 PHR. The filler may be present in an amount ranging from 20 to 100 PHR; in the alternative, from 40 to 180 PHR; in the alternative, from 60 to 150 PHR; or in the alternative, from 100 to 130 PHR.

In some embodiments, the inclusion of an adsorptive inorganic additive may improve the odor properties of the products provided herein though no odor issues exist with the specific examples mentioned herein. The addition of an odor absorber additive such as charcoal, calcium carbonate or magnesium oxide in the range from about 0.1 to about 3 weight percent, or about 0.5 to about 2 weight percent, based on the total composition, is effective in eliminating odors.

In other embodiments, the inventive compositions disclosed herein optionally comprise at least one UV stabilizer that may prevent or reduce the degradation of the inventive compositions by UV radiations. Any UV stabilizer known to a person of ordinary skill in the art may be added to the inventive compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the inventive composition can be from about greater than 0 to about 5 wt %, from about 0.01 to about 3 wt %, from about 0.1 to about 2 wt %, or from about 0.1 to about 1 wt % of the total weight of the inventive composition. Some UV stabilizers have been described in Zweifel Hans et al., "Plastics Additives Handbook," Hanser Gardner Publications, Cincinnati, Ohio, 5th edition, Chapter 2, pages 141-426 (2001), which is incorporated herein by reference.

Optionally, the inventive compositions disclosed herein can comprise at least one lubricant. In general, the lubricant can be used, inter alia, to modify the rheology of the molten inventive compositions, to improve the surface finish of molded articles, and/or to facilitate the dispersion of fillers or pigments. Any lubricant known to a person of ordinary skill in the art may be added to the inventive compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. In some embodiments, lubricants comprise an organopolysiloxane. In some embodiments, the organopolysiloxane can have an average molecular weight not less than 40,000 and a viscosity of at least 50.000 cSt.

Where used, the amount of the lubricant in the inventive composition may be from greater than 0 to 5 wt %; in the alternative, from 0.1 to 4 wt %; or in the alternative, from 0.1 to 3 wt % of the total weight of the inventive composition. Lubricants useful in various embodiments of the invention are disclosed in Zweifel Hans et al., "Plastics Additives Handbook," Hanser Gardner Publications, Cincinnati, Ohio, 5th edition, Chapter 5, pages 511-552 (2001), the disclosure of which is incorporated herein by reference.

Optionally, the inventive compositions can include an anti-microbial agent to impede and/or limit the growth of organisms typically encountered in cold and/or wet applications, including bacteriostatic and fungistatic compounds. For example and not limiting anti-microbial agents useful in the invention, any one or combination of anti-microbial agents available from The Dow Chemical Company (Midland, Mich.) under the name VINYZENE™, which include blends of dichloro-octyl-isothiazolone; 10,10'-oxybisphenoxarsine; octyl-isothiazolone; and trichlorophenoxyphenol. In a preferred embodiment, a blend of zinc pyritione and n-butyl-1, 2-benzisothiazonlin-3-one available from PolyChemAlloy (Lenoir, N.C.) and sold under the name PolySept™ 2003ZV-HF may be used in the inventive compositions.

Optionally, the inventive compositions may include additives to improve abrasion resistance. For example and without limiting the abrasion resistance additive useful in the invention, the polydimethylsiloxane compositions disclosed in U.S. Pat. No. 5,902,854, the disclosure of which is incorporated herein by reference, may be used in certain embodiments of the inventive compositions.

In certain aspects, the inventive compositions comprise at least one thermoplastic vulcanizates (TPVs), hydrogenated styrenic block copolymers (such as SEBS, or styrene-ethylene ethylene propylene-styrene (SEEPS)), or a combination thereof but not to exceed more than 50 wt % of the total elastomer content of the composition. Thermoplastic elastomers are rubber-like materials that, unlike conventional vulcanized rubbers, can be processed and recycled like thermoplastic materials. When the thermoplastic elastomer contains a vulcanized rubber, it may also be referred to as a thermoplastic vulcanizate (TPV). TPVs are thermoplastic elastomers with a chemically cross-linked rubbery phase, produced by dynamic vulcanization. One measure of this rubbery behavior is that the material will retract to less than 1.5 times its original length within one minute, after being stretched at room temperature to twice its original length and held for one minute before release (ASTM D1566). Another measure is found in ASTM D412, for the determination of tensile set. The materials are also characterized by high elastic recovery, which refers to the proportion of recovery after deformation and may be quantified as percent recovery after compression. A perfectly elastic material has a recovery of 100% while a perfectly plastic material has no elastic recovery. Yet another measure is found in ASTM D395, for the determination of compression set.

One example of a commercial TPV is SATOPRENE™ thermoplastic rubber which is manufactured by Advanced Elastomer Systems and is a mixture of crosslinked EPDM ("XL-EPDM") particles in a crystalline polypropylene matrix. Another example is VYRAM™, consisting of a mixture of polypropylene and natural rubber, marketed by Advanced Elastomer Systems. Other suitable elastomers include KRATON™, a brand of styrene block copolymer (SBC) marketed by KRATON Polymers, and DYNAFLEX™, a thermoplastic elastomer marketed by GLS Corporation and which is made with KRATON™ polymer.

The ingredients of the inventive compositions, i.e., the ethylene/α-olefin interpolymer, the at least one other polymer component, such as the elastomer (e.g., TPV, styrene/ethylene-butene/styrene (SEBS) copolymers), the polyolefin, such as hPP, RCP, LDPE, or HDPE and the optional additives, fillers and oil can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

In some embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using mixing equipment available from Brabender (e.g., BRABENDER PREP CENTERT™, available from C. W. Brabender Instruments, Inc., South Hackensack, N.J.) or BANBURY™ internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the inventive composition. The mixing or blending of polymers by extrusion has been described in C. Rauwendaal, "Polymer Extrusion", Hanser Publishers, New York, N.Y., pages 322-334 (1986), which is incorporated herein by reference.

When one or more additives are required in the inventive compositions, the desired amounts of the additives can be added in one charge or multiple charges to the ethylene/α-olefin interpolymer, the polyolefin or the inventive composition. Furthermore, the addition can take place in any order. In some embodiments, the additives are first added and mixed or blended with the ethylene/α-olefin interpolymer, and then the additive-containing interpolymer is blended with the polyolefin. In other embodiments, the additives are first added and mixed or blended with the polyolefin and then the additive-containing polyolefin is blended with the ethylene/α-olefin interpolymer. In further embodiments, the ethylene/α-olefin interpolymer is blended with the polyolefin first and then the additives are blended with the inventive composition.

The first thermoplastic elastomer composition may comprise a combination of two or more embodiments as described herein.

The second composition may comprise a combination of two or more embodiments as described herein.

Articles using the Inventive Compositions

The invention further provides an article comprising at least one component formed from an inventive composition. Articles which may be produced from the inventive composition include, for example, gaskets, profiles (including, for example, profiles used for refrigerators and/or freezers), molded articles, overmolded articles, sheeting, and tubing.

Some embodiments of an inventive article have a compression set, at 70° C., less than 70 percent; in the alternative, less than 65%; or in the alternative, less than 60%.

In one embodiment, the article is a gasket.

In another embodiment, the article is a profile.

Definitions

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene/α-olefin interpolymer," as used herein, refers to an interpolymer that comprises, in polymerized form, a majority amount of propylene monomer (based on the weight of the interpolymer), and at least one α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "elastomer," as used herein, refers any melt-processable polymer blend or copolymer in which a continuous elastomeric phase domain is reinforced by dispersed hard (glassy or crystalline) phase domains that act as junction points over a limited range of temperature.

The term "thermoplastic," as used herein, refers to a material that can be repeatedly made molten (soft) and solidified (hard) through heating and cooling, respectively.

The term "semi-crystalline polymer," as used herein, refers to polymers having regions of crystalline molecular structure and amorphous regions.

The term "elastomeric polymer," as used herein, refers to a thermoplastic elastomer.

The terms "blend," "polymer blend," and like terms, as used herein, mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "pre-compounded," as used herein, refers to the polymer used to make a polymer formulation, prior to any post reactor compounding or modification of such polymer. Such a polymer may contain small levels of fugitive process oils from processing equipment or from additive slurries, yet still be considered as not containing any oil. In the case where oil is intentionally added to the polymer prior to post reactor compounding or modification, the oil amount is determined relative to the weight of the polymer. For a "25% oil containing polymer," a 1 kg sample would comprise 0.2 kg of oil and 0.80 kg of polymer.

The polymers designated as "free-flowing" do not preclude the use of a surface additive such as talc or polyethylene powder to enhance the free-flowing nature of the product in use.

Test Methods

Test methods utilized in characterizing the components of the inventive and comparative examples include the following tests.

Test samples (except for the inventive and comparative examples shown in Table 11) were made on a fully intermeshing co-rotating twin screw extruder manufactured by Krupp Werner Pfleiderer Corporation (Model ZSK-25, a 25-mm screw diameter having a length to diameter ratio of 48:1). The extruder was equipped with two-hole strand die, water bath and pelletizer to produce resin in pellet form. The materials were starve-fed into the extruder using screw type powder feeders. The extruder conditions were zone 1 through zone 7 were 140° C., 190° C., 190° C., 190° C., 190° C., 190° C., 190° C., respectively, and 180° C. at the die. RPM of 500 was used with water chiller temperature of 10° C. Examples in Table 11 were processed using the conditions shown in Table 12.

Except for the inventive and comparative examples shown in Table 11, all samples used for TMA, DMS, Shore A hardness, NOBI, compression set, SRI, tensile strength and elongation at break, and tack force were injection molded plaques were injection molded on an Arburg 370C-80 ton injection molder using the 4 inch by 6 inch by 0.125 inch (10.16 cm by 15.24 cm by 0.32 cm) tool with a flat barrel profile of 440F (and for the examples in Table 11 using a flat barrel profile of 400F) and mold temperature of 18.33° C. and injection speed of 25 cc/s. Extrusion processing of compounds was performed on a Haake single screw extruder with an annular die (inner diameter (ID)=2.54 mm, wall thickness=0.42 mm). The extruded tube profile was air-cooled on a conveyor. Once stabilized, head pressure and torque were measured at various RPMs ranging from 20 to 160. Samples were collected at each RPM. Visual observations were made on the surface roughness and shape retention of the collected samples.

Standard CRYSTAF Method

Branching distributions are determined by crystallization analysis fractionation (CRYSTAF™) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus

Samples are compression molded using ASTM D 1928. Flexural and 2 percent secant moduli are measured according to ASTM D-790.

Differential Scanning calorimetry

Differential Scanning calorimetry results are determined using a TAI model Q1000 DSC equipped with an RCS cooling accessory and an autosampler. A nitrogen purge gas flow of 50 ml/min is used. The sample is pressed into a thin film, at 30000 psi for 5 minutes at 175° C., and then air-cooled to room temperature (25° C.). The pressed sample (3-10 mg) is then cut into a 6 mm diameter disk, accurately weighed, placed in a light aluminum pan (about 50 mg), and then crimped shut. The thermal behavior of the profile compositions samples is investigated with the following temperature profile. The sample is rapidly heated to 230° C. and held isothermal for 3 minutes, in order to remove any previous thermal history. The sample is then cooled to −90° C., at 10° C./min cooling rate, and held at −90° C. for 3 minutes. The sample is then heated to 230° C., at 10° C./min. heating rate. The cooling and second heating curves are recorded. The temperature of crystallization is noted as Tc (° C.).

The DSC melting peak is measured as the maximum in heat flow rate (W/g) with respect to the linear baseline drawn between −40° C. and end of melting. The heat of fusion is measured as the area under the melting curve between −40° C. and the end of melting using a linear baseline.

For olefin block copolymers or ethylene/α-olefin interpolymers, instead of cooling to −90 C, cooling to −40° C., and, instead of heating to 230° C., heating to 150° C. is done. The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30 C at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

Calculation of Percent Crystallinity

The percent crystallinity is calculated by dividing the heat of fusion ($\Delta Hf$), determined from the second heat curve, by a theoretical heat of fusion of 292 J/g for PE (165 J/g, for PP (propylene based polymers–majority weight percent polymerized propylene)), and multiplying this quantity by 100 (for example, % cryst.=($\Delta Hf$/292 J/g)×100 (for PE (ethylene based polymers–majority weight percent polymerized ethylene)). The melting point(s) (Tm) of each polymer sample is determined from the second heat curve obtained from DSC, as described above. The crystallization temperature (Tc) is measured from the first cooling curve GPC Method For Gel Permeation Chromatography (GPC) measurements, the chromatographic system used is a Polymer Laboratories Model PL-210. The column and carousel compartments were operated at 145° C. Four Polymer Laboratories 20-um Mixed-A LS columns were used, with a solvent of 1,2 4 Trichlorobenzene (TCB). The samples were prepared at a concentration of 0.1 g of polymer in 50 ml of solvent. The solvent contained 200 ppm of the antioxidant butylated hydroxytoluene (BHT). Samples were prepared by agitating lightly for 1-2 hours at 160° C. The injection volume was 200 microliters and the flow rate was 1.0 ml/min. Calibration of the GPC column set was performed with narrow molecular weight distribution polystyrene standards purchased from Varian Inc. (previously Polymer Laboratories). The polystyrene standard peak molecular weights were converted to polyethylene molecular weights using Williams, T., and I. M. Ward, "The Construction of Polyethylene Calibration Curve for Gel Permeation Chromatography Using Polystyrene Fractions", J. Polym. Sci. Polym. Lett., 6, 631 (1968): $M_{polyethylene}=0.431(M_{polystyrene})$.

Polyethylene equivalent molecular weight calculations are performed using Viscotek TriSEC software Version 3.0.

ATREF Analysis

Analytical temperature rising elution fractionation (ATREF) analysis is conducted according to the method described in U.S. Pat. No. 4,798,081, and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are both incorporated by reference herein, in their entirety. The composition to be analyzed is dissolved in trichlorobenzene, and allowed to crystallize in a column containing an inert support (stainless steel shot), by slowly reducing the temperature to 20° C., at a cooling rate of 0.1° C./min. The column is equipped with an infrared detector. An ATREF chromatogram curve is then generated by eluting the crystallized polymer sample from the column, by slowly increasing the temperature of the eluting solvent (trichlorobenzene) from 20 to 120° C., at a rate of 1.5° C./min.

$^{13}$C NMR Analysis

The samples are prepared by adding approximately "3 g of a 50/50 mixture of tetrachloroethane-d$^2$/orthodichlorobenzene" to "0.4 g sample" in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Stress-Strain

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens. Type C tear was measured using ASTM-882.

Block Index

The ethylene/α-olefin multiblock copolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI=\Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$2^{nd}$ moment weight average $$BI = \sqrt{\frac{\Sigma(w_i(BI_i - ABI)^2)}{\frac{(N-1)\Sigma w_i}{N}}},$$

where N is defined as the number of fractions with $BI_i$ greater than zero.

BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}},$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer. $T_{AB}$ is the ATREF elution temperature for a random copolymer of the same composition (having an ethylene mole fraction of $P_{AB}$) and molecular weight as the olefin block copolymer. $T_{AB}$ can be calculated from the mole fraction of ethylene (measured by NMR) using the following equation:

$$\text{Ln } P_{AB}=\alpha/T_{AB}+\beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639.$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from "Ln PX=$\alpha/T_{XO}+\beta$" from a measured $P_X$ mole fraction. Conversely, $P_{XO}$ is the ethylene mole fraction for a random copolymer of the same composition (i.e., the same comonomer type and content), and the same molecular weight, and having an ATREF temperature of $T_X$, which can be calculated from Ln $P_{XO}=\alpha/T_X+\beta$ using a measured value of $T_X$. Once the block index (BI) for each preparative TREF fraction is obtained, the weight average block index, ABI, for the whole polymer can be calculated.

Thermal Mechanical Analysis

Thermal Mechanical Analysis (TMA) (Penetration Temperature) is conducted on injection molded plaques. The instrument used was a TMA 7™ available from Perkin-Elmer. In the test, a probe with 1.5 mm radius tip (P/N N519-0416) is applied to the surface of the sample with 1N force. The temperature is raised at 5° C./min from 25° C. The probe penetration distance is measured as a function of temperature. The experiment ends when the probe has penetrated 1000 μm (1 mm) into the sample and all TMA temperatures are reported for a penetration depth of 1000 μm.

Dynamic Mechanical Spectroscopy

Rheology was measured using Dynamic Mechanical Spectroscopy (DMS). DMS experiments were conducted at 190° C. on a Rheometrics ARES equipped with 25 mm parallel plates. Sample discs (25 mm in diameter) were cut from the injection molded plaques and nitrogen purge. The frequency was varied between 0.1 and 100 rad/s. The strain amplitude was adjusted based upon the response of the samples between 4 and 10%. Rheology ratio (RR) was calculated as the ratio of the complex viscosity at 0.1 rad/s to complex viscosity at 100 rad/s. The tan δ which is a ratio of the loss modulus (G") to the storage modulus (G') was characterized at 0.1 rad/s.

Calculation of the Shape Retention Index (SRI)

All compounds are subjected to a DMS-Temperature Ramp Experiment from 90° C. to 190° C. in a parallel plate configuration on an ARES instrument from Rheometric Scientific using 25 mm parallel plate geometry at a frequency of 1 rad/s and a strain between 4 to 10% that is auto-adjusted to prevent overtorquing. log of tan delta is plotted as a function of log complex viscosity for a temperature range typically used in extrusion processes such as from 130° C. to 190° C. A straight line can be fit to this log tan delta vs. log complex viscosity plot, and the equation of the straight line, by linear regression in MICROSOFT OFFICE EXCEL 2003, can then be extrapolated from 1 to 5 on a log viscosity curve to determine the value of the tan(delta) at any viscosity. An ideal profile composition should possess low viscosities to extrude at high line speeds without melt fracturing the surface of the profile. Also, to prevent collapse of the profile, these compounds should possess low tan(delta). Shape retention index, SRI, is defined as the value of tan(delta) at a particular viscosity as determined by the DMS—temperature ramp extrapolations described above: SRI=tan(delta) at a particular viscosity in the range of 100-10000 Pa s. 25 mm diameter disc samples for the DMS testing were punched out from injection molded plaques with overall dimensions of 10.16 cm by 15.24 cm by 0.32 cm.

Density

Density (g/cm$^3$) was measured according to ASTM-D 792-03, Method B, in isopropanol. Specimens were measured within 1 hour of molding after conditioning in the isopropanol bath at 23° C. for 8 minutes, to achieve thermal equilibrium prior to measurement. The test specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt Indices and Melt Flow Rate

Melt index ($I_2$) of an ethylene-based polymer is measured in accordance with ASTM D-1238-04, condition 190° C./2.16 kg. Melt index ($I_5$) of an ethylene-based polymer is measured in accordance with ASTM D-1238-04, condition 190° C./5.0 kg. Melt index ($I_{10}$) of an ethylene-based polymer is measured in accordance with ASTM D-1238-04, condition 190° C./10.0 kg. High load melt index ($I_{21}$) of an ethylene-based polymer is measured in accordance with ASTM D-1238-04, condition 190° C./21.0 kg. For propylene-based polymers, the melt flow rate (MFR) is measured in accordance with ASTM D-1238-04, condition 230° C./2.16 kg.

Shore A Hardness

Shore A hardness was measured per ASTM D2240 on injection molded plaques of 0.32 cm thickness. This test method permits hardness measurements based on either initial indentation or indentation after a specified period of time, or both. As used herein, the indentation was measured at a specified time of 10 seconds.

Tensile and Elongation Properties

Tensile strength and elongation at break was measured using ASTM D 1708 which is a micro-tensile method with a pull rate of 5 inches/minute in the flow direction of the injection molded plaque. The dimensions of the injection molded plaque were 101.6 mm×152.4×3.2 mm.

Compression Set

Compression set was measured according to ASTM D-395 at 23° C., 40° C. and 70° C. The sample was prepared by stacking 25.4 mm diameter round discs cut from 0.125 inch thick injection molded plaques until a total thickness of 12.7 mm is reached. Injection molding was carried out on an Arburg 370C-80 ton injection molder using a plaque mold that is 101.6 mm×152.4×3.2 mm. Typical process conditions for sample preparation include the following: Barrel and Mold Temperatures, zones 1 through 4 and nozzle at 205° C. and mold at 15° C.; Extruder conditions of RPM 30 (m/min), back pressure of 15 bar, dosage of 70 cubic centimeters (cc), and real dosage of 72 cc; Optimal Injection parameters of injection speed of 25 cc/seconds, transfer position of 15 cc, pressure at transfer of 327 bar, fill time of 2.37 seconds, and cushion of 7.1 cc; hold conditions of pressure at 300 bar; hold time of 40 seconds, cool time of 20 seconds, dosage time of 7.2 seconds and a cycle time of 68.8 seconds. In some cases, compression set after 24 hours (h) at 40° C. or 60° C. at 25% strain is reported based on ISO 815-Type B method using 13 mm round disks, 6 mm thick. Samples cut from injection molded plaques (0.125" thick) are stacked up to a thickness of 6 mm.

Normalized Oil Bleed Index

Normalized oil-bleed index (NOBI) is an optical measurement to compare oil-bleed characteristics. Molded plaques are aged for 3 weeks (at 23° C. and 70° C.) while resting on sheets of ZigZag™ cigarette paper. After aging, the cigarette paper is removed and optically scanned against a black background to measure the extent of oil-bleed. The scanning is performed using the Xerox WorkCentre™ M118i copier/fax/scanner. The image is scanned in "Text" mode at 200 dpi, and saved as a TIFF file. The TIFF file is opened in MS Paintbrush, cropped on two sides, then saved. The image is then opened in Photoshop CS2 (v.9) and cropped on the other two sides. It is then converted to an 8-bit grayscale image so that a grayscale histogram can be created. The grayscale image is then analyzed using the Photoshop software to create a histogram showing the percentile of each of 4 quadrants of grayscale, ranging from 0 (black) to 255 (white). The average grayscale percentile is recorded. For example, if 1% of the pixels are in the 0-64 level of grayscale quadrant, and 3% of the pixels are in the 65-128 level of grayscale quadrant, and 15% are in the 129-192 level of grayscale quadrant, and 31% are in the 193-255 level of grayscale quadrant, the system calculates the average to be 12.5%. A normalized oil-bleed index (NOBI) is calculated according to the following equation:

Normalized Oil-bleed Index=100·(% grayscale sample–% grayscale control)/(100–% grayscale control).

The term "% grayscale sample" is the percent grayscale measured on the aged sample and "% grayscale control" is a measurement on an unaged untreated sheet of cigarette paper. NOBI has a range from 0 to 100. When NOBI=100, the paper is saturated and the test does not register oil-bleed beyond that level.

Tack Force

The tack force was measured using a ChemInstruments EZ Lab, Compatible Loop Tack Tester (Model LT-1000). The test sample was an injection molded or compression molded bar "4 inch×6 inch×0.125 inch." For each polymer composition, five bars were tested, and an average recorded.

The test bars were conditioned at 70° C. for seven days, in a forced air convention oven, before being tested for tack. The test method was based on a modified version of ASTM D6195-03, "Standard Test Methods for Loop Tack" (Reference: 3 *Annual Book of ATSM Standards*, Vol 15.06.). For each test, a bar was placed in the lower brace of the loop tack tester. A strip of "5 mil thick" MYLAR (1 inch×6 inch) was cut, using a "1 inch×6 inch" die. The end of the MYLAR strip was trimmed to form a "1 inch×5 inch" strip. The MYLAR strip was folded into a loop, with the glossy side as the exterior side, and place in the top grip of the Loop Tack tester. The exterior surface of the loop was brought into controlled contact with a "1 inch×1 inch" surface of test bar specimen, with the only force applied being the weight of the MYLAR strip itself. The MYLAR strip was then removed from the substrate, and the force to remove the MYLAR strip from the contacting surface was measured by a recording instrument.

Mooney Viscosity

Polymer Mooney viscosity (ML 1+4 at 125° C.) was measured in accordance with ASTM 1646-04, with a one minute preheat time and a four minute rotor operation time. The instrument is an Alpha Technologies Rheometer MDR.

EXAMPLES

The following examples illustrate the present invention but are not intended to limit the scope of the invention. The weight percent of the components of each of the inventive and comparative examples are based on the total formulation weight, unless stated otherwise.

Table 1 lists components used in preparing the Inventive and Comparative Examples. NORDEL IP Hydrocarbon Rubbers, ENGAGE Polyolefin Elastomers, VERSIFY Elastomers and Plastomers and INFUSE Olefin Block Copolymers are available from The Dow Chemical Company; PROFAX resins are available from Lyondellbasell Industries N.V. (Rotterdam, Netherlands), and LUPEROX compounds are organic peroxides available from Arkema, Inc. (Philadelphia, Pa.).

TABLE 1

| Polymer | Type | Mooney Viscosity or $I_2$ (g/10 min) or MFR (g/10 min) | Density (g/cc) | Crystallinity (wt %) | Rheology Ratio (V0.1/V100), 190° C. | Tan delta @ 0.1 rad/s. 190° C. | Tc (° C.) |
|---|---|---|---|---|---|---|---|
| NORDEL IP 4770 | EPDM | 70 Mooney | 0.88 | 13 | 32 | 1.3 | 34 |
| NORDEL IP 3760 | EPDM | 60 Mooney | 0.87 | 12 | 35 | 1.06 | 12 |
| NORDEL IP 4725 | EPDM | 25 Mooney | 0.88 | 12 | 20 | 1.70 | 36 |
| NORDEL IP 3720 | EPDM | 20 Mooney | 0.88 | 14 | 15 | 2.4 | 43 |
| OBC-00 | EO-OBC* | 0.5 | 0.877 | 18 | 7 | 6.0 | 98 |
| OBC-07 | EO-OBC | 0.5 | 0.866 | 9.5 | 7 | 6.0 | 89 |
| OBC-507 | EO-OBC | 5.0 | 0.866 | — | — | — | — |
| OBC-1 | EO-OBC | 0.13 | 0.877 | 18.0 | 16 | 3.13 | 98 |
| OBC-2 | EO-OBC | 0.2 | 0.878 | 18.0 | 26 | — | 101 |
| OBC-3 | EO-OBC | 0.15 | 0.870 | 9.0 | 25 | — | 100 |
| OBC-4 | Peroxide modified OBC-1** | — | 0.877 | 18.0 | 39 | 1.17 | 98 |
| OBC-5 | Peroxide modified OBC-1*** | — | 0.877 | 18.0 | 85 | 0.64 | 98 |
| OBC-6 | Peroxide modified OBC-07**** | — | — | — | 33 | 1.04 | 98 |

TABLE 1-continued

| Polymer | Type | Mooney Viscosity or I$_2$ (g/10 min) or MFR (g/10 min) | Density (g/cc) | Crystallinity (wt %) | Rheology Ratio (V0.1/V100), 190° C. | Tan delta @ 0.1 rad/s. 190° C. | Tc (° C.) |
|---|---|---|---|---|---|---|---|
| OBC-7 | E-beamed OBC-07 with 2.1 MRad dosage | — | 0.866 | 10.0 | 43 | 0.93 | 90 |
| OBC-8 | Ethylene/propylene OBC | I$_2$ = 0.15 | 0.866 | 8.9 | 12.3 | 2.2 | 76 |
| VERSIFY 2300 | Propylene Based Elastomer (PBE) | MFR = 2 | 0.865 | 10.0 | 10.0 | 4.6 | 28.0 |
| VERSIFY 2400 | Propylene Based Elastomer (PBE) | MFR = 2 | 0.858 | — | — | — | — |
| Propylene based elastomer (PBE)-1 | High melt strength (HMS) PBE | Mooney = 50 | 0.865 | 10.0 | 32 | 1.70 | 28.0 |
| ENR 6386 | HMS Ethylene/propylene copolymer | Mooney = 26 | 0.875 | 18.0 | 56 | 1.1 | 45 |
| ENGAGE HM 7387 | HMS ethylene/butene copolymer | I$_2$ = 0.2 | 0.87 | | | | |
| EXP-21 | Peroxide-modified ethylene/octene/ polypropylene blend | — | — | — | — | — | — |
| LDPE 662i | LDPE | I$_2$ = 0.5 | | | | | |
| 5E16S | hPP | MFR = 35 | | | | | |
| PROFAX PF814 | E-beam hPP | MFR = 2.5 | | | | | |
| 7021-50 | rcPP | MFR = 50 | | | | | |
| PROFAX 6823 | hPP | 0.5 MFR | | | | | |
| PROFAX PD 702 | hPP | 35 MFR | | | | | |
| D221 | hPP | 35 MFR | | | | | |
| DMDA 8920 | HDPE | I$_2$ = 20 | 0.954 | — | — | — | — |

*Ethylene/octene multiblock copolymer.
**Modified with 0.05 wt % Luperox 101 and 0.05 wt % SR350.
***Modified with with 0.1 wt % Luperox 101 and 0.1 wt % SR350 co-agent.
****Peroxide modified OBC-07 (69 wt %) and hPP 5A10 (1.2 MFR) with 0.05 wt % LUPEROX 101 and 0.05 wt % SR350.

In each of Tables 2-6, the component polymers are given in weight percentages. Calcium carbonate available from Imerys Performance Minerals under the mark ATOMITE, and MB50-002 (a masterbatch of pelletized formulation containing 50% of an ultra-high molecular weight, siloxane polymer dispersed in polyethylene (LDPE) homopolymer), available from Dow Corning under the name MB50-002 MASTERBATCH, were used in the inventive and comparative examples in Tables 2-6.

The term "NM," as used in all tables herein means "not measured."

Tables 2A-2B below provides the formulations and observed properties for Inventive Example ("Inventive Ex.") 1 and Comparative Examples ("Comparative Ex.") A-D, respectively. Each of the formulations in Tables 2A-2B contains 15 wt % oil. Tensile properties, shown in Tables 2A-2B, were measured per ASTM D638 (508 mm/sec pull rate). Black color concentrate used is available from Americhem, Inc. sold under the name ESCORENE AN13K.

TABLE 2A

| | Inventive Ex. 1 |
|---|---|
| NORDEL IP 4770, wt % | 45.7 |
| 5E16S PP, wt % | 16.8 |
| PARALUX 6001R Oil, wt % | 15 |
| CaCO$_3$, wt % | 20 |
| MB50-002 MASTERBATCH, wt % | 0.5 |
| ESCORENE AN13K, wt % | 2 |
| Hardness Shore A | NM |
| Density (g/cc) | 1.03 |
| Ult. Tensile (MPa) | 7.7 |
| Ult. Elongation (%) | 568 |
| Tear Strength Die C (N/mm) | 54 |
| Comp. Set (CS) % @ 23° C. | 35 |
| Comp. Set (CS) % @ 70° C. | 57 |
| Melt fracture | None at up to 160 rpm |
| Torque data | NM |
| Shape retention | Yes |
| TMA (° C. at 1000 μm) | 97 |
| Tc (° C.) | 89 |
| Overall acceptability* | Yes |

TABLE 2A-continued

|  | Inventive Ex. 1 |
|---|---|
| SRI at 1000 Pa s | 1.25 |
| SRI at 10000 Pa s | 0.95 |

*The term "overall acceptability," as used herein, indicates whether the sample possessed the inventive properties of shape retention, as well as the inventive balance of Shore A hardness and compression set at 40° C. and/or at 70° C. In addition, the inventive compositions show no melt fracture at 160 rpm.

TABLE 2B

|  | Comparative Ex. A | Comparative Ex. B | Comparative Ex. C | Comparative Ex. D |
|---|---|---|---|---|
| ENX 8921, wt % | 62.5 |  |  |  |
| ENR 6386, wt % |  | 46.9 |  |  |
| OBC-00, wt % |  |  | 46.9 | 46.9 |
| LDPE 662i, wt % |  |  | 15.6 |  |
| PROFAX PF814 PP, wt % | 0 | 15.6 |  | 15.6 |
| PARALUX 6001R Oil, wt % | 15 | 15 | 15 | 15 |
| $CaCO_3$ wt % | 20 | 20 | 20 | 20 |
| MB50-002, MASTERBATCH, wt % | 0.5 | 0.5 | 0.5 | 0.5 |
| ESCORENE AN13K, wt % | 2 | 2 | 2 | 2 |
| Hardness Shore A | 82 | 74 | 63 | 73 |
| Density (g/cc) | 0.98 | 1.01 | 0.99 | 1.01 |
| Ult. Tensile (MPa) | 5.7 | 5.7 | 7.4 | 9.3 |
| Ult. Elongation (%) | 500 | 330 | 980 | 930 |
| Tear Strength Die C (N/mm) | 37.3 | 25.2 | 33.6 | 45.7 |
| Compression Set % @ 23° C. (ASTM) | 32 | 42 | 33 | 33 |
| Compression Set % @ 70° C. (ASTM) | 87 | 77 | 50 | 50 |
| Melt fracture | None at up to 160 rpm | None at up to 160 rpm | Melt fracture @ 40 rpm+ | Melt fracture @ 40 rpm+ |
| Torque data | 2000 mg at 160 rpm | 2700 mg at 160 rpm | 3500 mg at 160 rpm | 3500 mg at 160 rpm |
| Shape retention | Yes | Yes | No | No |
| TMA (° C. at 1000 μm) | 100 | 120 | 103 | 122 |
| Tc (° C.) | 134 | 110 | 130 | 120 |
| Overall acceptability | No (CS poor) | No (CS poor) | No | No |
| SRI at 1000 Pa s | 1.25 | 2.27 | 6.6 | 5.3 |
| SRI at 10000 Pa s | 0.78 | 1.00 | 2.19 | 2.2 |

Tables 2A and 2B illustrate that Inventive Example 1 exhibits tensile, elongation, and compression properties which meet the criteria for overall acceptability. In contrast, the Comparative Examples do not meet the requirements for overall acceptability. Comparative Examples C and D do not meet the inventive SRI requirements and Comparative Examples A and B do not meet the inventive compression set requirements. Tables 3A-3B provide the formulations and observed properties for Inventive Examples 2-5 and Comparative Example E, respectively. Each of the formulations in Tables 3A-3B include 25 wt % Oil.

TABLE 3A

|  | Inventive Ex. 2 | Inventive Ex. 3 | Inventive Ex. 4 | Inventive Ex. 5 |
|---|---|---|---|---|
| NORDEL IP 4770, wt % | 39.4 | 19.7 | 29.7 | 29.7 |
| OBC-8, wt % | — | 19.7 | — | — |
| SEBS KRATON 1651, wt % | — | — | — | 10 |
| SANTOPRENE 101-64 TPV, wt % | — | — | 10 | — |
| D221-35 MFR PP, wt % | — | — | 13.1 | 13.1 |
| PROFAX PD702 (35 MFR PP), wt % | 13.1 | 13.1 | — | — |
| $TiO_2$, wt % | 2 | 2 | 2 | 2 |
| PARALUX 6001R Oil, wt % | 25 | 25 | 25 | 25 |
| $CaCO_3$, wt % | 20 | 20 | 20 | 20 |
| MB50-002 MASTERBATCH, wt % | 0.5 | 0.5 | 0.5 | 0.5 |
| Shore A Hardness | 72 | 66 | 74 | 72 |
| Density (g/cc) | 1.03 | 1.02 | 1.03 | 1.0 |
| Ult. Tensile (MPa) | 5.8 | 4.33 | 6.0 | 7.26 |
| Ult. Elongation (%) | 615 | 676 | 632 | 658 |
| Tear Strength (N/mm) | 39.5 | 33.6 | 39.8 | 39.7 |
| Compression Set (%) @ 23° C. (ASTM) | 37 | 36 | — | — |
| Compression Set (%) @ 70° C. (ASTM) | 68 | 74 | 73.4 | — |
| Compression Set (%) 40° C. (ISO) (25%, 24 h) | 65.3 | 54.2 | 64.3 | 59.3 |
| Compression Set (%) 60° C. (ISO) (25%, 24 h) | 85.3 | 72.3 | 81.5 | 77.9 |
| Melt Fracture | No | No | No | No |
| Torque data at 160 rpm | NM | NM | 2200 | 2800 |
| Shape retained | Yes | Yes | Yes | Yes |
| Overall acceptability | Yes | Yes | Yes | Yes |
| TMA (° C. at 1000 μm) | 80 | 97 | — | — |
| Tc (° C.) | 105 | 92 | — | — |
| SRI at 1000 Pa s | 1.6 | 2.5 | 2.3 | 2.2 |
| SRI at 10000 Pa s | 1.0 | 1.50 | 1.05 | 1.15 |

TABLE 3B

|  | Comparative Ex. E |
|---|---|
| OBC-8, wt % | 39.7 |
| 7021-50 (50 MFR RCP PP), wt % | 13.1 |
| $TiO_2$, wt % | 2 |
| Oil, wt % | 25 |
| $CaCO_3$, wt % | 20 |
| MB50-002 MASTERBATCH, wt % | 0.5 |
| Shore A Hardness | 60 |
| Density (g/cc) | 1.03 |
| Ult. Tensile (MPa) | 3.4 |
| Ult. Elongation (%) | 809 |
| Tear Strength (N/mm) | 25.0 |
| Compression Set (%) at 23° C. (ASTM) | — |
| Compression Set (%) at 70° C. (ASTM) | — |
| Compression Set (%) at 40° C. (ISO) (25%, 24 h) | — |
| Compression Set (%) at 60° C. (ISO) (25%, 24 h) | — |
| Melt Fracture | Yes |
| Torque data at 160 rpm | 3000 |
| Shape retained | No |
| Overall acceptability | No |
| TMA (° C. at 1000 μm) | 113 |
| Tc (° C.) | 92 |
| SRI at 1000 Pa s | 4.15 |
| SRI at 10000 Pa s | 2.27 |

The Inventive Examples and Comparative Examples shown in Tables 3A and 3B illustrate that the addition of SEBS or OBC to EDPM formulations can reduce the high temperature Compression Set in comparison to formulations that include only EDPM, oil and filler. As can be seen in the Table 3A, each of the Inventive Examples meet the inventive requirements for overall acceptability. Table 3B illustrates that Comparative Example E does not meet, at least, the SRI requirements for an inventive composition.

Tables 4A-4B provide the formulations and observed properties for Inventive Examples 6-7 and Comparative Examples F-H, respectively.

TABLE 4A

|  | Inventive Ex. 6 | Inventive Ex. 7 |
|---|---|---|
| NORDEL IP 4770, wt % | — | 34.4 |
| OBC-7, wt % | 39.4 | — |
| 5E16S-35 MFR PP, wt % | 13.1 | — |
| PROFAX PD702 (35 MFR PP), wt % | — | 13.1 |
| $TiO_2$, wt % | 2 | 2 |
| PARALUX 6001 R Oil, wt % | 25 | 30 |
| $CaCO_3$, wt % | 20 | 20 |
| MB50-002 MASTERBATCH, wt % | 0.5 | 0.5 |
| Density (g/cc) | NM | 1.03 |
| Ult. Tensile (MPa) | 2.88 | 6.07 |
| Ult. Elongation (%) | 1294 | 666 |
| Tear Strength (N/mm) | NM | 36.6 |
| Compression Set (%) at 23° C. (ASTM) | 21 | NM |
| Compression Set (%) at 70° C. (ASTM) | 52 | 64 |
| Compression Set (%) at 40° C. (ISO) | NM | 72.3 |
| Compression Set (%) at 60° C. (ISO) | NM | NM |
| Melt Fracture | No | No |

TABLE 4A-continued

|  | Inventive Ex. 6 | Inventive Ex. 7 |
|---|---|---|
| Torque at 160 rpm | NM | 2300 |
| Shape retained | Yes | Yes |
| Overall acceptability | Yes | Yes |
| $T_c$ (° C.) | — | 126 |
| SRI at 1000 Pa s | 1.5 | 2.08 |
| SRI at 10000 Pa s | 1 | 1.27 |

TABLE 4B

|  | Comp. Ex. F | Comp. Ex. G | Comp. Ex. H |
|---|---|---|---|
| NORDELIP 4770, wt % | 39.3 | — | — |
| OBC-07, wt % | — | 39.4 | 35.6 |
| 5E16S-35 MFR PP, wt % | — | 13.1 | — |
| PROFAX 6823 (12 MFR) PP, wt % | — | — | 11.83 |
| PROFAX PD702 (35 MFR PP), wt % | 13.13 | — | — |
| $TiO_2$, wt % | 2 | 2 | 2 |
| PARALUX 6001 Oil, wt % | 25 | 25 | 35 |
| $CaCO_3$, wt % | 20 | 20 | 15 |
| MB50-002 MASTERBATCH, wt % | 0.5 | 0.5 | 0.5 |
| LUPEROX 101 (crosslinker), wt % | 0.05 | — | 0.047 |
| SR 350**, wt % | 0.02 | 0 | 0.023 |
| Density (g/cc) | 1.03 | NM | 0.99 |
| Ult. Tensile (MPa) | 5.7 | 2.15 | 4.08 |
| Ult. Elongation (%) | 428 | 1664 | 847 |
| Tear Strength (N/mm) | 44 | NM | 27.4 |
| Compression Set (%) at 23° C. (ASTM) | — | 24 | 25.10 |
| Compression Set (%) at 70° C. (ASTM) | 68 | 66 | NM |
| Compression Set (%) at 40° C. (ISO) (25%, 24 h) | 59.4 | NM | 51.5 |
| Compression Set (%) at 60° C. (ISO) (25%, 24 h) | 69.6 | NM | 61.8 |
| Melt Fracture | No | Yes | No |
| Torque at 160 rpm | NM | NM | 2300 |
| Shape retained | Yes | No | No |
| Overall acceptability | Yes | No | No |
| TMA (° C. at 1000 µm) | 106 | — | — |
| $T_c$ (° C.) | 125 | — | — |
| SRI at 1000 Pa s | 0.932 | 4.10 | 2.85 |
| SRI at 10000 Pa s | 0.658 | 2.53 | 1.74 |

**SR350 indicates trimethylolpropane trimethacrylate, a low volatility trifunctional monomer used as a co-agent during peroxide modification.

Table 4A illustrates that Inventive Examples 6 and 7 each meet the inventive compositional and overall acceptability requirements. Table 4B illustrates that Comparative Example F and H contain a vulcanization agent and/or co-agent. Comparative Examples G and H do not meet, at least, the inventive requirement of overall acceptability. Tables 5A-5B provide the formulations and observed properties for Inventive Examples 8-10 and Comparative Examples I-M.

Tables 5A-5B provide the formulations and observed properties for Inventive Examples 8-10 and Comparative Examples I-M.

TABLE 5A

|  | Inventive Ex. 8 | Inventive Ex. 9 | Inventive Ex. 10 |
|---|---|---|---|
| OBC-2, wt % | 39.4 | — | — |
| OBC-3, wt % | — | 39.4 | — |
| PBE-1, wt % | — | — | 39.4 |
| 5E16S, wt % | 13.1 | 13.1 | 13.1 |
| $CaCO_3$, wt % | 20 | 20 | 20 |
| PARALUX 6001 R, wt % | 25 | 25 | 25 |
| $TiO_2$, wt % | 2 | 2 | 2 |
| MB50-002 MASTERBATCH, wt % | 0.5 | 0.5 | 0.5 |
| Compression Set (%) at 23° C. (25%, 22 h) (ASTM) | 19.4 | 24.7 | 24.7 |
| Compression Set (%) at 70° C. (25%, 22 h) (ASTM) | 45.8 | 57 | 55.9 |
| Hardness (ASTM) | 72.7 | 65.5 | 76.8 |
| Compression Set (%) at 40° C. (ISO) (25%, 24 h) | 30.3 | — | 44.6 |
| Compression Set (%) at 60° C. (ISO) (25%, 24 h) | 36.7 | — | 52.5 |
| Avg. Tensile @ Break (MPa) | 6.19 | 4.81 | 8.76 |
| Avg. Ult. Elong (%) | 764 | 702 | 702 |
| TMA (° C. at 1000 µm) | 123 | 114 | 119 |
| Tc (° C.) | 101 | 103 | 102 |
| Torque @ 175 C. (160 rpm) | 2241 | 2301 | 2216 |
| Melt Fracture | No | No | No |
| Shape Retained | Yes | Yes | Yes |
| Overall acceptability | Yes | Yes | Yes |
| SRI at 1000 Pa s | 2.6 | 2.6 | 4.44 |
| SRI at 10000 Pa s | 1.44 | 1.41 | 1.45 |

TABLE 5B

|  | Comp. Ex. I | Comp. Ex. J | Comp. Ex. K | Comp. Ex. L | Comp. Ex. M |
|---|---|---|---|---|---|
| OBC-00, wt % | 39.4 | — | — | — | — |
| OBC-4, wt % | — | 39.4 | — | — | — |
| OBC-5, wt %, | — | — | 39.4 | — | — |
| OBC-1, wt % | — | — | — | 39.4 | — |
| VERSIFY 2300, wt % | — | — | — | — | 39.4 |
| 5E16S (35 MFR PP), wt % | 13.1 | 13.1 | 13.1 | 13.1 | 13.1 |
| $CaCO_3$, wt % | 20 | 20 | 20 | 20 | 20 |
| PARALUX 6001R, wt % | 25 | 25 | 25 | 25 | 25 |
| $TiO_2$, wt % | 2 | 2 | 2 | 2 | 2 |
| MB50-002 MASTERBATCH, wt % | 0.5 | 0.5 | 0.5 | 0.5 | 0.5 |
| Compression Set (%) at 23° C. (25%, 22 h) (ASTM) | 20.2 | 23.1 | 25.5 | 19.4 | 25.7 |
| Compression Set (%) at 70° C. (25%, 22 h) (ASTM) | 50.8 | 50.7 | 49.3 | 44.6 | 62.8 |
| Hardness (ASTM) | 69.3 | 72.6 | 73.4 | 70.4 | 78.3 |
| Compression Set (%) at 40° C. (ISO) (25%, 24 h) | 32.9 | 34.9 | — | — | — |
| Compression Set (%) at 60° C. (ISO) (25%, 24 h) | 38.3 | 38.4 | — | — | — |
| Avg. Tensile @ Break (Mpa) | 5.32 | 5.14 | 4.53 | 6 | 10.3 |
| Avg. Ult. Elongation (%) | 843 | 549 | 388 | 791 | 899 |
| TMA (° C. at 1000 µm) | 113 | 120 | 134 | 116 | 119 |
| Tc (° C.) | 102 | 100 | 102 | 99 | 102 |
| Torque @ 175° C. (160 rpm) | 2353 | 2538 | 2214 | 2810 | 1927 |
| Melt Fracture | No | No | Yes | No | No |
| Shape Retained | No | Yes | Yes | Yes | No |
| Overall acceptability | No | Yes | No | No | No |
| SRI at 1000 Pa s | 3.36 | 1.85 | 1.24 | 4.78 | 6.28 |
| SRI at 10000 Pa s | 2.26 | 0.99 | 0.82 | 2.05 | 1.36 |

Table 5A illustrates that each of Inventive Examples 8-10 meet the inventive requirements of overall acceptability. Comparative Examples J and K each contain peroxide modified OBCs (see Table 1). As can be seen in Table 5B Comparative Examples I, L and M do not meet, at least, the inventive requirement of overall acceptability.

Tables 6A-6B provide the formulations and observed properties for Inventive Examples 11-13 and Comparative Examples N-Q, respectively.

TABLE 6A

|  | Inventive Ex. 11 | Inventive Ex. 12 | Inventive Ex. 13 |
|---|---|---|---|
| NORDEL IP 4770, wt % | 39.4 | — | 39.4 |
| NORDEL IP 3760, wt % | — | 39.4 | — |
| hPP 5E16S (35 MFR PP), wt % | 13.1 | 13.1 | — |
| HDPE DMDA 8920, wt % |  |  | 13.1 |
| CaCO$_3$, wt % | 20 | 20 | 20 |
| PARALUX 6001R, wt % | 25 | 25 | 25 |
| TiO$_2$, wt % | 2 | 2 | 2 |
| MB50-002 | 0.5 | 0.5 | 0.5 |

TABLE 6A-continued

|  | Inventive Ex. 11 | Inventive Ex. 12 | Inventive Ex. 13 |
|---|---|---|---|
| MASTERBATCH, wt % |  |  |  |
| Compression Set (%) at 23° C. (ASTM) | 31 | 52.8 | 31 |
| Compression Set (%) at 70° C. (ASTM) | 82.3 | 79.7 | 60.1 |
| Compression Set (%) at 40° C. (ISO)(25%, 24 h) | 62.7 | — | 64.0 |
| Compression Set (%) at 60° C. (ISO)(25%, 24 h) | 86.1 | — | 72.6 |
| Shore A Hardness | 67.5 | 49.8 | 69.0 |
| Avg. Tensile @ Break (Mpa) | 7.99 | 2.45 | 5.8 |
| Av. Ult. Elong (%) | 840 | 730 | 763 |
| TMA (° C. at 1000 µm) | 96 | 101 | 121 |
| T$_c$ (° C.) | 82 | 80 | 110 |
| Torque @ 175° C. (160 rpm) | 2776 | 2992 | 3735 |
| Melt Fracture | No | No | No |
| Shape Retained | Yes | Yes | Yes |
| Overall acceptability | Yes | Yes | Yes |
| SRI at 1000 Pa s | 1.79 | 1.85 | 3.9 |
| SRI at 10000 Pa s | 1.16 | 1.28 | 1.5 |

TABLE 6B

|  | Comparative Ex. N | Comparative Ex. O | Comparative Ex. P | Comparative Ex. Q |
|---|---|---|---|---|
| NORDEL IP 4725, wt % | 39.4 |  |  |  |
| NORDEL IP 3720, wt % |  | 39.4 |  |  |
| OBC-6, wt % |  |  | 52.5 |  |
| D9007, wt % |  |  |  | 36.7 |
| hPP 700-12,* wt % |  |  |  | 15.7 |
| hPP 5E16S (35 MFR PP), wt % | 13.1 | 13.1 | 0 | 0 |
| CaCO$_3$, wt % | 20 | 20 | 20 | 20 |
| PARALUX 6001 R, wt % | 25 | 25 | 25 | 25 |
| TiO$_2$, wt % | 2 | 2 | 2 | 2 |
| MB50-002 MASTERBATCH, wt % | 0.5 | 0.5 | 0.5 | 0.5 |
| LUPEROX 101, wt % |  |  |  | 0.05 |
| SR-350, wt % |  |  |  | 0.05 |
| Compression Set (%) at 23° C. (ASTM) | 39.2 | 36.4 | 27.1 | 27.3 |
| Compression Set (%) at 70° C. (ASTM) | — | — | 60 | 60.4 |
| Compression Set (%) at 40° C. (ISO) (25% at 24 hrs) | 69.5 | — | — | — |
| Compression Set (%) at 60° C. (ISO) (25% at 24 hrs) | 85.2 | — | — | — |
| Hardness | 64 | 62.3 | 64.8 | 67.3 |
| Avg. Tensile @ Break (Mpa) | 4.86 | 3.78 | 4.78 | 4.99 |
| Avg. Ult. Elong (%) | 793 | 724 | 699 | 726 |
| TMA (° C. at 1000 µm) | 83 | 71 | 123 | 128 |
| T$_c$ (° C.) | 81 | 82 | 97 | 98 |
| Torque @ 175° C. (160 rpm) | 2250 | 2374 | 2124 | 2199 |
| Melt Fracture | No | No | No | No |
| Shape Retained | No | No | Yes | No |
| Overall acceptability | No | No | Yes | Yes |
| SRI at 1000 Pa s | 2.03 | 2.43 | 1.91 | 2.19 |
| SRI at 10000 Pa s | 1.3 | 1.46 | 1.10 | 1.35 |

*hPP700-12 is a homopolypropylene (MFR = 12) available from The Dow Chemical Company.

As seen in Table 6A, each of Inventive Examples 11-13 meet all requirements of the inventive composition. Comparative Examples N and O do not meet the inventive requirement of overall acceptability. Comparative Example P contains a peroxide modified OBC (see Table 1). Comparative Example Q was peroxide modified (see Table 1).

Table 7 provides the components for the formulations shown in Tables 8-10. Table 8 provides the formulations for Inventive Examples 14-16 and Comparative Examples R-S.

Each of the Inventive and Comparative Examples in Table 8 include 72.5 PHR oil. Table 9 provides the formulations for Inventive Examples 17-19 and Comparative Examples T-U. Each of the Inventive and Comparative Examples in Table 9 include 130 PHR oil. Table 10 provides the formulations for Inventive Examples 20-22 and Comparative Examples V-W. Each of the Inventive and Comparative Examples in Table 10 include 190 PHR oil.

Table 11 provides the formulations of Inventive Examples 23-26 and Comparative Examples X-Y. All quantities in Table 11 are in weight percentages. Table 12 provides the extruder conditions for the samples of the Inventive and Comparative Examples of Table 11 that were prepared on a ZSK-30 twin screw extruder with dual injector ports. Table 13 provides the characteristics of Inventive Examples 23-26 and Comparative Example X-Y.

TABLE 7

| | $I_2$, g/10 min | $I_{10}$, g/10 min | $I_{10}/I_2$ | ΔHf, (J/g) | % Cry, wt % | Mn, g/mole | Mw, g/mole | Mw/Mn | % Ethylene, by NMR | Mooney Viscosity† | RR# |
|---|---|---|---|---|---|---|---|---|---|---|---|
| R04* | 0.382 | 4.637 | 12.14 | 75.17 | 25.7 | 48,330 | 12,740 | 2.5 | 66.5 | Less than 55 | |
| R07** | | 1.305 | | 34.4 | 11.8 | 61,270 | 188,300 | 3.07 | 65.8 | 70 | 30 |
| R08*** | | 1.485 | | 39.84 | 13.6 | 55,010 | 169,010 | 3.07 | 70.8 | 70 | 32 |
| NORDEL IP 4770$^a$ | | | | 39.5 | 13.5 | 59,360 | 180,590 | 3.04 | 70 | 70 | 32 |
| NORDEL IP 4785$^b$ | | | | 41 | 14.0411 | 83,260 | 174,970 | 2.10 | 68 | 85 | |
| VISTAL-LON 3666## | | | | 13.7 | 4.7 | | | >4 | 63 | 60 | |

*R04 is a diene free single reactor EP containing 66 wt % ethylene and having an $I_2$ of 0.4 g/10 min.
**R07 is a diene free, single reactor, ethylene/propylene copolymer (EP) containing 66 wt % ethylene and having a Mooney Viscosity of 70.
***R08 is a diene free single reactor EP containing 71 wt % ethylene and having a Mooney Viscosity of 70.
†ML (1 + 4), 125° C.).
RR indicates the rheology ratio (V0.1/V100), 190 C.
Oil extended polymer.
$^a$Mooney Viscosity of 70 and 70 wt % Ethylene.
$^b$Mooney Viscosity of 85 and 68 wt % Ethylene.

TABLE 8

| | Comp. Ex. R | Inv. Ex. 14 | Comp. Ex. S | Inv. Ex. 15 | Inv. Ex. 16 |
|---|---|---|---|---|---|
| R07, wt % | 37.2 | | | | |
| R08, wt % | | 37.2 | | | |
| R04, wt % | | | 37.2 | | |
| NORDEL IP 4770, wt % | | | | 37.2 | |
| NORDEL IP 4785, wt % | | | | | 37.2 |
| HDPE 8920, wt % | 12.8 | 12.8 | 12.8 | 12.8 | 12.8 |
| Paralux Oil 6001R, wt % | 27 | 27 | 27 | 27 | 27 |
| TiO2, wt % | 2.5 | 2.5 | 2.5 | 2.5 | 2.5 |
| MB50-002 MASTERBATCH, wt % | 0.5 | 0.5 | 0.5 | 0.5 | 0.5 |
| Calcium Carbonate (Atomite), wt % | 20 | 20 | 20 | 20 | 20 |
| Formulation properties | | | | | |
| Compression Set (%) at 23° C. (ASTM) | 38.67 | 32.71 | 41.66 | 30.07 | 30.42 |
| Compression Set (%) at 40° C. (ASTM) | 55.17 | 61.48 | 64.93 | 64.10 | 61.74 |
| Compression Set (%) at 70° C. (ASTM) | 55.02 | 60.74 | 88.84 | 69.39 | 74.86 |
| Shore A Harness (10 s) | 50.00 | 62.30 | 80.64 | 66.90 | 59.66 |
| Avg. 100% Mod | 1.13 | 1.88 | 3.61 | 2.23 | 1.67 |
| Avg. 2% Mod | 0.04 | 0.07 | 0.38 | 0.08 | 0.05 |
| Avg. 300% Mod | 1.59 | 2.43 | 4.12 | 3.10 | 2.34 |
| Avg. Tensile at Break | 2.09 | 3.33 | 5.14 | 4.28 | 3.26 |
| Avg. Ult. Elongation | 737.34 | 714.24 | 656.08 | 635.32 | 676.07 |
| NOBI*, 23° C. | 0.00 | 4.14 | 100.00 | 0.00 | 0.00 |
| NOBI, 70° C. | 6.78 | 0.00 | 1.95 | 2.36 | 0.00 |
| Tack Force (N) | 0.0318 | 0.00742 | 0.10403 | 0.00712 | 0.00763 |
| Tack Force St. dev. (N) | 0.01346 | 0.00065 | 0.06044 | 0.0075 | 0.00064 |
| Rheology Ratio | 11.36 | 9.69 | 5.40 | 11.20 | 12.60 |
| TMA (° C.) | 118.49 | 119.63 | 121.73 | 119.60 | 120.32 |
| $T_c$ (° C.) | 109.5 | 109.8 | 109.8 | 108.5 | 108.3 |

*Normalized Oil Bleed Index.

TABLE 9

|  | Comp. Ex. T | Inv. Ex. 17 | Comp. Ex. U | Inv. Ex. 18 | Inv. Ex. 19 |
|---|---|---|---|---|---|
| R07, wt % | 27.0 | | | | |
| R08, wt % | | 27.0 | | | |
| R04, wt % | | | 27.0 | | |
| NORDEL IP 4770, wt % | | | | 27.0 | |
| NORDEL IP 4785, wt % | | | | | 27 |
| Hydrobrite 550, wt % | 35.1 | 35.1 | 35.1 | 35.1 | 35.1 |
| CaCO$_3$, (Atomite), wt % | 27.0 | 27.0 | 27.0 | 27.0 | 27 |
| HDPE 8920, wt % | 10.8 | 10.8 | 10.8 | 10.8 | 10.8 |
| Formulation properties | | | | | |
| Compression Set (%) at 23° C. (ASTM) | 38.54 | 37.15 | 42.32 | 31.60 | 35.62 |
| Compression Set (%) at 40° C. (ASTM) | 55.63 | 62.56 | 66.60 | 69.90 | 67.47 |
| Compression Set (%) at 70° C. (ASTM) | 67.65 | 70.07 | 80.42 | 76.45 | 76.80 |
| Shore A (10 s) | 34.24 | 49.52 | 72.70 | 55.70 | 45.38 |
| Avg. 100% Mod | 0.72 | 1.03 | 2.21 | 2.72 | 0.97 |
| Avg. 2% Mod | 0.02 | 0.03 | 0.13 | 0.05 | 0.02 |
| Avg. 300% Mod | 1.07 | 1.46 | 2.59 | 3.87 | 1.43 |
| Avg. Tensile at Break | 1.39 | 2.15 | 3.61 | 5.89 | 2.06 |
| Avg. Ult. Elongation | 713.70 | 804.88 | 778.45 | 710.81 | 669.10 |
| NOBI, 23° C. | 0.83 | 3.50 | 100.00 | 2.91 | 0.00 |
| NOBI, 70° C. | 1.81 | 6.45 | 47.59 | 3.75 | 0.00 |
| Tack Force (N) | 0.25521 | 0.00915 | 0.09969 | 0.00979 | 0.00701 |
| Tack Force St. Dev. (N) | 0.21362 | 0.00187 | 0.0763 | 0.00728 | 0.00184 |
| Rheology Ratio | 7.40 | 6.60 | 3.84 | 8.89 | 6.88 |
| TMA (° C.) | 105.5 | 107.4 | 118.8 | 114.4 | 111.6 |
| $T_c$ (° C.) | 109.3 | 108.4 | 110.1 | 106 | 106 |

TABLE 10

|  | Comp. Ex. V | Inv. Ex. 20 | Inv. Ex. 21 | Inv. Ex. 22 | Comp. Ex. W |
|---|---|---|---|---|---|
| R07, wt % | 22.5 | | | | |
| R08, wt % | | 22.5 | | | |
| NORDEL IP 4770, wt % | | | 22.5 | | |
| NORDEL IP 4785, wt % | | | | 22.5 | |
| VISTALLON 3666 (EPDM with 75 PHR oil), wt % | | | | | 39.4 |
| Hydrobrite 550, wt % | 42.7 | 42.7 | 42.7 | 42.7 | 25.8 |
| CaCO$_3$, (Atomite), wt % | 22.5 | 22.5 | 22.5 | 22.5 | 22.5 |
| HDPE 8920, wt % | 12.3 | 12.3 | 12.3 | 12.3 | 12.3 |
| Formulations | | | | | |
| Compression Set (%) at 23° C. (ASTM) | 38.60 | 37.00 | 35.53 | 36.57 | 28.44 |
| Compression Set (%) at 40° C. (ASTM) | 59.30 | 64.67 | 60.49 | 58.97 | 39.84 |
| Compression Set (%) at 70° C. (ASTM) | 64.49 | 66.21 | 69.97 | 72.75 | 63.45 |
| Shore A (10 s) | 30.12 | 50.36 | 58.80 | 51.28 | 40.76 |
| Avg. 100% Mod | 0.58 | 1.15 | 1.58 | 1.19 | 0.92 |
| Avg. 2% Mod | 0.02 | 0.03 | 0.05 | 0.04 | 0.02 |
| Avg. 300% Mod | 0.85 | 1.63 | 2.14 | 1.70 | 1.35 |
| Avg. Tensile at Break | 1.11 | 2.26 | 3.01 | 2.37 | 1.63 |
| Avg. Ult. Elongation | 724.49 | 740.12 | 701.36 | 675.31 | 650.22 |
| NOBI, 23° C. | 0.52 | 1.79 | 0.00 | 2.63 | 0.00 |
| NOBI, 70° C. | 8.92 | 0.00 | 0.00 | 11.73 | 0.00 |
| Tack Force (N) | 0.59228 | 0.19186 | 0.00818 | 0.00967 | 0.00922 |
| Tack Force St. Dev. (N) | 0.40426 | 0.2066 | 0.00222 | 0.00241 | 0.00068 |
| Rheology Ratio | 6.25 | 6.09 | 7.57 | 6.28 | 45.96 |
| TMA (° C.) | 99.82 | 117.42 | | | |
| $T_c$ (° C.) | 108 | 110 | 107 | 110 | 108 |

TABLE 11

|  | Comp. Ex. X | Inv. Ex. 22 | Inv. Ex. 23 | Inv. Ex. 24 | Inv. Ex. 25 | Inv. Ex. 26 | Comp. Ex. Y |
|---|---|---|---|---|---|---|---|
| NORDEL IP 4770 | 19.6 | 23.3 | 24.4 | 25.6 | 27.0 | 28.6 | 30.3 |
| Hydrobrite 550 | 25.5 | 30.2 | 31.7 | 33.3 | 35.1 | 37.1 | 39.4 |
| CaCO$_3$, (Atomite) | 19.6 | 23.3 | 24.4 | 25.6 | 27.0 | 28.6 | 30.3 |
| HDPE 8920 | 35.3 | 23.3 | 19.5 | 15.4 | 10.8 | 5.7 | 0.0 |

TABLE 12*

|  | Comp. Ex. X | Inv. Ex. 22 | Inv. Ex. 23 | Inv. Ex. 24 | Inv. Ex. 25 | Inv. Ex. 26 | Comp. Ex. Y |
|---|---|---|---|---|---|---|---|
| Zone 1 (° C.) | 120/119 | 118 | 122 | 120 | 122 | 123 | 123 |
| Zone 2 (° C.) | 175/166 | 160 | 168 | 169 | 171 | 168 | 169 |
| Zone 3 (° C.) | 170/171 | 164 | 167 | 173 | 176 | 172 | 169 |
| Zone 4 (° C.) | 165/165 | 168 | 165 | 164 | 163 | 168 | 167 |
| Zone 5 (° C.) | 160/166 | 161 | 168 | 168 | 165 | 164 | 164 |
| Die Temp., ° C. | 81 | 140/102 | 103 | 102 | 106 | 104 | 99 |
| Adaptor Temp., ° C. | 122 | 150/143 | 148 | 149 | 150 | 153 | 152 |
| Pelletizer Speed (RPM) | 2000 | 2000 | 2000 | 2000 | 1400 | 1400 | 1400 |
| Die Pressure (psig) | 1640 | 1340 | 1329 | 1282 | 1090 | 1560 | 1028 |
| Extruder RPM | 200 | 200 | 200 | 200 | 200 | 200 | 200 |
| Extruder Torque, % | 60 | 54 | 56 | 53 | 48 | 52 | 42 |
| Feeder #1 (lb/hr) | 15.7 | 11.3 | 10.1 | 9 | 739 | 6.8 | 5.6 |
| Feeder #2 (lb/hr) | 5.6 | 5 | 5.6 | 5.6 | 5.6 | 5.6 | 5.6 |
| Oil Injector 1, lb/hr | 5.1 | 5.1 | 5.1 | 5.1 | 5.1 | 5.1 | 5.1 |
| Oil Injector 2, lbs/hr | 2.2 | 2.2 | 2.2 | 2.2 | 2.2 | 2.2 | 2.2 |
| Total Rate (lb/hr) | 28.6 | 24.2 | 23 | 21.9 | 20.8 | 19.7 | 18.5 |

*Using a Model ZSK-30, a 30-mm screw diameter.

TABLE 13

|  | Comp. Ex. X | Inv. Ex. 22 | Inv. Ex. 23 | Inv. Ex. 24 | Inv. Ex. 25 | Inv. Ex. 26 | Comp. Ex. Y |
|---|---|---|---|---|---|---|---|
| Compression Set 40° C. (%) (ASTM) | 54 | 55 | 55 | 55 | 58 | 62 | 67 |
| Compression Set 70° C. (%) (ASTM) | 51 | 51 | 51 | 46 | 57 | 62 | 85 |
| Hardness Shore A (10 s) | 91 | 82 | 79 | 75 | 65 | 57 | 41 |
| Avg. 10% Stress (psi) | 726 | 360 | 297 | 191 | 89 | 39 | 22 |
| Avg. 100% Stress (psi) | 821 | 568 | 491 | 449 | 270 | 197 | 121 |
| Avg. 2% Stress (psi) | 132 | 73 | 63 | 35 | 15 | 5 | 4 |
| Avg. 300% Stress (psi) | 826 | 587 | 516 | 532 | 309 | 232 | 165 |
| Avg. Tensile at Break (psi) | 1409 | 1242 | 1224 | 660 | 1014 | 988 | 1048 |
| Std. Dev. of Tensile at Break | 41 | 50 | 34 | 33 | 30 | 113 | 27 |
| Avg. Ult. Elong (%) | 1075 | 1137 | 1164 | 686 | 1267 | 1371 | 1466 |
| Tack force (N) | 0.01073 | 0.01017 | 0.01081 | 0.01024 | 0.01024 | 0.00979 | 0.01094 |
| Tack force St. Dev. (N) | 0.0073 | 0.00116 | 0.00206 | 0.00124 | 0.00104 | 0.00157 | 0.0015 |
| NOBI, 23° C. | 100.00 | 100.00 | 40.07 | 16.11 | 12.55 | 2.34 | 32.77 |
| NOBI, 70° C. | 100.00 | 15.10 | 11.11 | 3.62 | 18.45 | 5.72 | *unable to peel sample |

Comparative examples R, T and V use an EP rubber with delta H less than 36 J/g with a tack force in the final article form IS greater than 0.012 N that is unacceptable from a tack perception. Comparative Examples S and U use an EP rubber with a Mooney viscosity close to 20, which is less than the preferred range of greater than 55. The NOBI for these samples, S and U, is unacceptable as such low Mooney polymers are unable to hold high levels of oil. Comparative Example W uses VISTALLON 3666 containing 75 phr of oil that is supplied as a bale rather than pellets, and is not the preferred route for Thermoplastic Extrusion compounders. Inventive Examples 14-22, on the other hand, are formulations containing ethylene/α-olefin interpolymers having a ΔHf greater than 36 J/g, and a Mooney viscosity greater than 55, and also containing an HDPE. These compositions also have rheology ratio greater than 25. The Inventive Example formulations have the right balance of shore A hardness, compression set at elevated temperatures, low tack, low oil bleed, tensile strength, elongation, and TMA.

Comparative Example R exhibits a tack force that is too high (note that the ΔHf of R07 is 34 J/g ΔHf). Comparative Example S includes R04 which has a Mooney viscosity less than 55. Comparative Example S also had a high tack force.

Inventive Examples 22-26 are formulations with an EPDM having a ΔHf greater than 36 J/g and a Mooney viscosity greater than 55 as component A, and a HDPE as component B. These formulations also have a rheology ratio greater than 25. These inventive compositions exhibit the inventive balance of shore A hardness, compression set at elevated temperatures, low tack, low oil bleed, tensile strength and elongation. Comparative Example Y that has no HDPE and underwent a distortion in shape. Comparative Example X had NOBI values of 100 indicating significant oil bleed. The remaining Comparative Examples did not have an optimum balance of properties.

Inventive Example 27 contained EPDM 1/HDPE 1 (75/25 or 3/1 ratio)+1 wt % PDMS (MB50-002) was prepared using a continuous mixer. The EPDM 1 had a Mooney Viscosity (ML (1+4) at 125° C.) of 70, a ΔHf of 39.4 and a MWD of 3.04. The HPDE 1 has a density of 0.954 g/cc and a melt index ($I_2$) of 20 g/10 min.

Inventive Example 27 was formed in a Farrel CP 250 continuous mixer. The mixer was equipped with the 2.88 inch, 7/7 rotor combination with two dams at the 4 and 5 positions and a vent in the middle of the 7/8 position. The EPDM 1 (74.25 wt %) and HDPE 1 (24.75%) and PDMS (MB50-002 MASTERBATCH) (1%, based on the total composition weight)) were fed via loss and weigh feeders, and the polymers were melted and compounded in the mixer. The residence time was controlled by a feed rate at 300 pounds per hour, orifice opening of 45-65%, and a mixer rotor speed of 300-450 RPM. The mixer conditions are shown in Table 14.

TABLE 14

| Mixer Conditions (Melt Temp. = 225° C.) | | | |
|---|---|---|---|
| | Orifice | Chamber Body | Feed Hopper |
| Set Point Temp. (° C.) | 150 | 150 | 50 |
| Actual Temp. (° C.) | 165 | 142 | 99 |

Once polymers were mixed, the compounded ribbon was then fed into the 4 inch 11/1 L/D extruder to be extruded into strands. A six hole strand die was utilized. The strands were then run through a 16 foot water bath with initial water temperature at 20° C., prior to cutting into pellets. The extruder conditions are shown in Table 15.

TABLE 15

| Extruder Conditions (Melt Temp. = 223° C.) | | | | |
|---|---|---|---|---|
| | Die Heat | Adapter | Forward Heat | Rear |
| Set Point Temp. (° C.) | 210 | 210 | 210 | 210 |
| Actual Temp. (° C.) | 215 | 210 | 210 | 207 |

Some rheological properties of this example are listed in Table 16 below.

TABLE 16

| Freq rad/s | G' Pa | G'' Pa | Eta* Pa-s | tan_delta | Temp ° C. | Torque g-cm | Strain % | G* Pa | Phase Angle ° |
|---|---|---|---|---|---|---|---|---|---|
| 0.1 | 4083.79 | 5242.94 | 66457.3 | 1.28384 | 190 | 20.6942 | 9.95353 | 6645.73 | 52.084 |
| 0.15849 | 5438.59 | 6790.37 | 54892.4 | 1.24855 | 189.99 | 27.0804 | 9.94977 | 8699.85 | 51.308 |
| 0.25119 | 7157.69 | 8759.15 | 45032.8 | 1.22374 | 190 | 35.191 | 9.9443 | 11311.7 | 50.745 |
| 0.39811 | 9353.63 | 11267.9 | 36784.8 | 1.20465 | 190 | 45.527 | 9.93737 | 14644.3 | 50.303 |
| 0.63096 | 12218.6 | 14566.5 | 30132.8 | 1.19216 | 190 | 59.0536 | 9.92835 | 19012.5 | 50.01 |
| 1 | 15932.6 | 18727.2 | 24587.7 | 1.1754 | 190 | 76.2756 | 9.91604 | 24587.7 | 49.61 |
| 1.58489 | 20783.6 | 23974.5 | 20019.7 | 1.15353 | 190 | 98.2651 | 9.8995 | 31729 | 49.078 |
| 2.51189 | 27177.7 | 30548.3 | 16277.8 | 1.12402 | 190 | 126.409 | 9.88217 | 40888 | 48.342 |
| 3.98107 | 35497.7 | 38571.5 | 13167.3 | 1.08659 | 190 | 161.668 | 9.8582 | 52419.9 | 47.376 |
| 6.30957 | 46306.9 | 48235.2 | 10597.4 | 1.04164 | 190.01 | 205.49 | 9.82337 | 66865.3 | 46.168 |
| 10 | 59830.8 | 59232.5 | 8419.15 | 0.99 | 190 | 257.635 | 9.78155 | 84191.5 | 44.712 |
| 15.8489 | 77295.8 | 72158.6 | 6671.91 | 0.93354 | 190 | 321.721 | 9.72524 | 1.06E+05 | 43.031 |
| 25.1189 | 99022.7 | 86512.8 | 5234.76 | 0.87367 | 190 | 397.365 | 9.6597 | 1.31E+05 | 41.143 |
| 39.8107 | 1.25E+05 | 1.02E+05 | 4060.27 | 0.81191 | 190 | 484.048 | 9.57202 | 1.62E+05 | 39.073 |
| 63.0957 | 1.58E+05 | 1.18E+05 | 3121.3 | 0.74935 | 190 | 582.897 | 9.46078 | 1.97E+05 | 36.846 |
| 100 | 1.94E+05 | 1.33E+05 | 2352.86 | 0.68636 | 190.01 | 685.454 | 9.31222 | 2.35E+05 | 34.464 |

Inventive Example 27 has excellent rheological properties (for example, V0.1/V100=28), and good shear thinning behavior. This example also had good shape retention and control.

The present invention may be embodied in other forms without departing from the spirit and the essential attributes thereof, and, accordingly, reference should be made to the appended claims, rather than to the foregoing specification, as indicating the scope of the invention.

We claim:

1. A thermoplastic composition comprising:
   i) component C, an ethylene/α-olefin interpolymer wherein the interpolymer has a Mooney Viscosity (ML 1+4, 125° C.) greater than, or equal to, 55 and a ΔHf greater than, or equal to, 36 J/g; and
   ii) component D, a high density polyethylene (HDPE) wherein the HDPE has an $I_2$ from 1 to 50 g/10 min; and wherein the ethylene/α-olefin interpolymer is an ethylene/α-olefin/diene interpolymer having a rheology ratio (V0.1/V 100) at 190° C. greater than, or equal to 25.

2. The thermoplastic composition of claim 1, wherein component C has a molecular weight distribution (MWD) less than 4.

3. The thermoplastic composition of claim 1, wherein the HDPE is present in an amount from 30 to 100 PHR, based on the weight of the ethylene/α-olefin interpolymer.

4. The thermoplastic composition of claim 1, further comprising an oil.

5. The thermoplastic composition of claim 1, further comprising a filler.

6. The thermoplastic composition of claim 1, wherein the composition has a compression set less than 70 percent, as measured by ASTM D-395 at 70° C.

7. The thermoplastic composition of claim 1, wherein the composition does not include a vulcanization agent or vulcanization co-agent.

8. An article comprising the composition of claim 1.

* * * * *